(12) United States Patent
Takagi et al.

(10) Patent No.: US 6,980,363 B1
(45) Date of Patent: Dec. 27, 2005

(54) IMAGE OBSERVATION APPARATUS AND SYSTEM

(75) Inventors: Akinari Takagi, Yokosuka (JP); Shoichi Yamazaki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1214 days.

(21) Appl. No.: 09/653,278

(22) Filed: Aug. 31, 2000

(30) Foreign Application Priority Data

| Nov. 8, 1999 | (JP) | ................................. 11-316568 |
| Mar. 3, 2000 | (JP) | ............................. 2000-058737 |

(51) Int. Cl.$^7$ ......................... G02B 27/14; H01J 40/14; G02F 1/1335
(52) U.S. Cl. .............................. 359/630; 250/214 VT; 349/11
(58) Field of Search .................... 250/214 VT; 349/11; 359/630, 631, 633, 407

(56) References Cited

U.S. PATENT DOCUMENTS

| 4,467,190 A | 8/1984 | Hadani ................. 250/214 VT |
| 5,034,809 A | 7/1991 | Katoh .......................... 348/53 |
| 5,550,585 A | 8/1996 | Cherri ................... 348/207.99 |
| 5,933,279 A | 8/1999 | Yamazaki ................... 359/630 |
| 6,094,241 A | 7/2000 | Yamazaki ..................... 349/11 |
| 2004/0140949 A1 * | 7/2004 | Takagi ........................... 345/8 |

FOREIGN PATENT DOCUMENTS

| EP | 0 380 035 | 8/1990 | .......... G02B 27/00 |
| EP | 0 583 116 | 2/1994 | .......... G02B 17/06 |
| JP | 57-168205 | 10/1982 | |
| JP | 2-281891 | 11/1990 | |
| JP | 03-119890 | 5/1991 | |
| JP | 10-239628 | 9/1998 | |
| JP | 11-174367 | 7/1999 | |
| JP | 2000-059666 | 2/2000 | |
| WO | WO 85/04961 | 11/1985 | .......... G02B 27/00 |

\* cited by examiner

Primary Examiner—David N. Spector
(74) Attorney, Agent, or Firm—Fitzpatrick, Cella, Harper & Scinto

(57) ABSTRACT

An image observation system includes a pair of image observation devices for the left and right eyes of an observer. Each of the image observation devices includes an image pickup system which forms an image on a image pickup device using an image pickup optical system, and a display system which guides the light from the image acquired by the image pickup system to an observers eye by a display optical system. Each of the image observation devices is arranged so that the outside optical axis of the image pickup optical system is approximately aligned with an extension line of the eye-side optical axis of the display optical system. In the image observation system, the image pickup device included in the image pickup system of each image observation device is shifted horizontally by a predetermined distance relative to the optical axis of the image pickup optical system, and the display element is shifted horizontally by a predetermined distance relative to the optical axis of the display optical system. The optical axes of the image pickup optical systems and the optical axes of the display optical systems in the pair of image observation devices for the left and right eyes are parallel to each other.

24 Claims, 21 Drawing Sheets

IMAGE OBSERVATION APPARATUS AND SYSTEM

BACKGROUND OF THE INVENTION

1. Field of the Invention

The present invention relates to image observation apparatus and systems and is preferably applicable to image observation apparatus and systems, for example, constructed in such structure that a scene of the outside world (an outside image or outside information) captured by an image pickup optical system (image pickup system) is displayed on a display device (image display means) to permit an observer to observe it, or to image observation apparatus and systems designed for the purpose of permitting the observer to have various pseudo experiences while displaying an image (virtual image) artificially produced by a computer or the like or an image recorded by a video system or the like over the real scene (outside information) on the image display means.

2. Related Background Art

There are conventionally known image observation devices constructed in such structure that the outside image (outside information) is converted to an electric signal by an image pickup device such as a CCD camera or the like, it is displayed on a display device (display means) such as a CRT, an LCD or the like, and the observer is allowed to observe the outside image through an eyepiece optical system (such observation will hereinafter be referred to as "video seethrough observation") as if he or she were observing the outside by the naked eye.

There are also the image observation devices proposed in such structure that the outside image picked up by the camera is displayed in combination with the image created by computer graphics or the like or with an image recorded by the video system or the like so as to permit the observer to observe a synthetic scene of the real space and the virtual space.

In the image observation devices of these structures, in order to match positions of objects etc. in the observing direction with those in the observation by the naked eye, the outside optical axis of the image pickup optical system of the image pickup system is aligned with the eye-side optical axis of the eyepiece optical system of the display system and the entrance pupil of the image pickup optical system is located at the position equivalent to the entrance pupil of the ocular optical system.

It is, however, expeimentally verified that, when the image pickup optical system is located at the exactly equivalent position against the ocular optical system, there arises the problem that an object displayed on the image display means is perceived in the size smaller than that in the observation of the outside by the naked eye.

FIG. 28 provides the results of experiments for comparison between perceived sizes in the observation by the naked eye and in the video seethrough observation with a device wherein the image pickup optical system is located at the optically, exactly equivalent position relative to the ocular optical system, where an object of a certain size was observed at different distances. FIG. 28 shows a graph of the perceived size of the object plotted against the distance to the object.

In FIG. 28, the solid line represents the results in the observation by the naked eye and the dashed line the results in the video seethrough observation. It is understood that the object in the video seethrough observation is significantly perceived in the size smaller than that in the observation by the naked eye.

FIG. 23 is a schematic diagram to show the main part of a conventional image observation system wherein a pair of image observation devices each having the image pickup system and the display system are provided for the left and right eyes of the observer. In the drawing, elements for the left eye are accompanied by suffix L and elements for the right eye by suffix R. It is noted that the suffixes L, R indicating the elements for the left and right eyes are omitted in the description below.

In FIG. 23, each image pickup system 100 is composed of an image pickup optical system 101 and an image pickup device 102, and numeral 103 designates the outside optical axis of the image pickup optical system. A mirror 104 separates optical paths of display system 110 from those of the image pickup system 100. Each display system 110 is composed of a display optical system 111 and a display element 112, and numeral 113 designates the eye-side optical axis of the display optical system.

A pair of such image observation devices each consisting of the image pickup system 100 and the display system 110 are provided for the left and right eyes. E represents the observing eyes.

The image pickup systems 100 and the display systems 110 illustrated in FIG. 23 are constructed in such structure that the center 102C of the image pickup device 102 and the optical axis 103 of the image pickup optical system 101 are matched with the center 112C of the display element 112 and the optical axis 113 of the display optical system and that the optical axes 103R, 103L of the image pickup optical systems for the left and right eyes and the optical axes 113R, 113L of the display optical systems are inclined at the angle θ so as to intersect at a reference position 120 located in the outside.

A plane 112' (virtual image screen) in conjugate with the display element 112 with respect to each display optical system 111 is matched with a plane 102' (focal plane) in conjugate with the image pickup device 102 with respect to the image pickup optical system 101, and center positions 102C', 112C' of the respective planes are matched at the reference position 120. The center positions for the left and right eyes are also matched at the reference position 120.

FIG. 24 and FIG. 25 show a situation in which with the image observation system illustrated in FIG. 23, the object 130 in the outside space is imaged by the image pickup systems 100 to be displayed by the display systems 110 and in which the observer is observing the object image.

In FIG. 24, the object 130 in the outside space is in focus on the image pickup devices 102 via the mirrors 104 and the image pickup optical systems 101 to form images 131 thereon to be picked up. The position of each image corresponds to a spot 131' on the focal plane 102' conjugate with the image pickup device 102, and is a distance P apart from the center 120 of the focal plane.

The image 131 of the object 130 taken by the associated pickup system 100 is displayed as an image 132 on each display element 112 as illustrated in FIG. 25. In FIG. 25, light from each display element 112 is guided to the observing eye E by the mirror 104 and the display optical system 111. Each observing eye E observes the corresponding image 132 as an image 132' on the virtual image screen 112' conjugate with the display element 112. The position of each image 132' is a distance Q apart from the center 120 of the virtual image screen.

The observer observes the image 132'R by the right eye ER and the image 132'L by the left eye EL. This permits the observer to observe the object 130 as if it were actually present at an intersection 134 between the visual axis 133R of the right eye ER and the visual axis 133L of the left eye EL. At this time, where the entrance pupil position of each image pickup optical system 101 is matched with the entrance pupil position of the corresponding observing eye E and where the angle of image pickup view and the angle of display view are equated, the position and size of the focal plane 102' of each image pickup system are matched with those of the virtual image screen 112' of the associated display system, so that the distance P becomes equal to the distance Q. Therefore, the position of the intersection 134 becomes the same as the actual position of the object 130 in the outside space and the reproduced object size also becomes equal to that of the object 130.

In the image observation system illustrated in FIG. 23, if the image pickup optical systems 101 have the zooming function or if the display magnification is varied by use of an electronic zoom or the like, there will occur cases in which the reproduced space is distorted or cases in which the observer fails to effect the fusion of the images for the left and right eyes.

This phenomenon will be described below with reference to FIG. 26, FIG. 27A, and FIG. 27B. FIG. 26 shows a case of observation where the picked up images of the object 130 in the outside space as illustrated in FIG. 24, acquired by the image pickup systems 100, are displayed at the magnification of 2 on the display elements to be observed. The distances S from the screen center 120, of the display images 135' on the virtual image screens 112' are twice the distances Q in FIG. 25. Just as in the case of FIG. 25, the observer can observe the object 130 as if it were actually present at the intersection 137 between the visual axis 136R of the right eye ER and the visual axis 136L of the left eye EL. The observer can observe the object as if he or she became closer to the object or as if the object became larger.

However, the visual axes of the left and right eyes can intersect with each other (or the left and right images can undergo fusion) only if the object 130 is within the XZ plane (Y=0). FIG. 27A is a YZ section in the state illustrated in FIG. 25 and FIG. 27B a YZ section in the state illustrated in FIG. 26. In FIG. 27A and FIG. 27B, suffixes y, z attached to Q and S indicate a Y-directional component and a Z-directional component thereof, respectively.

As illustrated in FIG. 27A, where the images are picked up by the image pickup systems without use of the zooming function to be displayed by the display systems and be observed, the visual axes 133R, 133L of the left and right eyes ER, EL agree in the YZ plane and thus intersect with each other even if the object 130 is not present in the XZ plane (Qy ≠0). However, where the zooming function is used as illustrated in FIG. 27B, the visual axes 136R, 136L of the left and right eyes ER, EL do not agree in the YZ plane and thus do not intersect with each other. Deviation is permitted to some extent if it is small, but it will induce fatigue of the observer and distortion of the reproduced space. With large deviation, there will arise the problem of failure in the fusion of the left and right images.

Not only in the cases using the zooming function, but also in the cases wherein the angle of image pickup view does not agree with the angle of display view because of design factors, production errors, etc., the above-stated problem will arise.

SUMMARY OF THE INVENTION

An object of the present invention is to provide an image observation apparatus that permits the observer to observe the outside in like size in the video seethrough observation and in the observation by the naked eye.

Another object of the present invention is to provide an image observation system that causes no distortion of the reproduced space and that permits the observer to succeed in the fusion of the images for the left and right eyes without stress even in the cases wherein the zooming function is used during the video seethrough observation, in the cases wherein the angle of image pickup view and the angle of display view do not agree with each other because of the design factors, production errors, etc., in the cases wherein the entrance pupil position of the image pickup optical system is not matched with the entrance pupil position of the observing eye, and so on.

Another object of the present invention is to provide an image observation apparatus that can decrease the size of the entire apparatus, so as to reduce the load on the observer when mounted on the head.

Another object of the present invention is to provide an image observation apparatus wherein the image pickup system is constructed of a prism with a surface having transmission action and total internal reflection action, thereby permitting decrease in the size of the entire apparatus, efficiently guiding the outside light to the image pickup device, and readily obtaining a bright outside image.

An image observation apparatus according to one aspect of the present invention is an image observation apparatus comprising an image pickup system for acquiring an outside image via an image pickup optical system, and a display system for displaying the outside image acquired by the image pickup system on display means and guiding light from the display means via an eyepiece optical system to an eye, in which a position of an exit pupil of the eyepiece optical system is approximately matched with a position of an entrance pupil of an ocular optical system, so as to permit observation of the image, wherein an outside optical axis of the image pickup optical system is approximately aligned with an extension line of an eye-side optical axis of the eyepiece optical system and wherein an entrance pupil of the image pickup optical system is shifted toward the outside from a position equivalent to the entrance pupil of the ocular optical system.

In a further aspect of the present invention, the following condition is satisfied:

$$d \leq 60 \text{ (mm)}$$

where d is a shift amount of the entrance pupil of said image pickup optical system relative to the position equivalent to the entrance pupil of said ocular optical system.

In a further aspect of the present invention, an angle of image pickup view of the outside image acquired by said image pickup system is approximately equated to an angle of display view of display by said display system.

In a further aspect of the present invention, the image observation apparatus comprises image generating means for generating an image and image combining means for combining images, and said image combining means combines the image from the image generating means with the image from said image pickup system to form a synthetic image and displays the synthetic image on said display means.

In a further aspect of the present invention, said image pickup system comprises a prism consisting of a plurality of planes, said prism comprises a plane having transmission action and total internal reflection action, and light having passed through the prism is guided to an image pickup device by an optical element having a positive optical power.

In a further aspect of the present invention, said image pickup system comprises a decentered, rotationally asymmetric, reflecting surface with optical powers differing depending upon azimuthal angles.

In a further aspect of the present invention, said display system comprises a decentered, rotationally asymmetric, reflecting surface with optical powers differing depending upon azimuthal angles.

In an image observation system according to one aspect of the present invention, a pair of the image observation apparatus described above are provided for the left and right eyes of the observer.

An image observation apparatus according to one aspect of the present invention is an image observation apparatus comprising an image pickup system for acquiring an outside image via an image pickup optical system, and a display system for displaying the outside image acquired by the image pickup system on display means and guiding light from the display means via an eyepiece optical system to an eye, in which a position of an exit pupil of the eyepiece optical system is approximately matched with a position of an entrance pupil of an ocular optical system, so as to permit observation of the image, wherein said display system comprises a prism body having a decentered, rotationally asymmetric, reflecting surface with optical powers differing depending upon azimuthal angles, wherein an outside optical axis of the image pickup optical system is approximately aligned with an extension line of an eye-side optical axis of the eyepiece optical system, wherein an entrance pupil of the image pickup optical system is shifted toward the outside from a position equivalent to the entrance pupil of the ocular optical system, and wherein, where an amount of the shift is d, the shift amount d satisfies the following condition:

$d \leq 60$ (mm).

In a further aspect of the present invention, said image pickup system comprises a reflecting surface and a direction of deflection of the optical axis by the reflecting surface is a direction different from a direction of deflection of the optical axis by the reflecting surface of said display system.

In a further aspect of the present invention, an angle of image pickup view of the outside image acquired by said image pickup system is approximately equated to an angle of display view of display by said display system.

In a further aspect of the present invention, the image observation apparatus comprises image generating means for generating an image and image combining means for combining images, and said image combining means combines the image from the image generating means with the image from said image pickup system to form a synthetic image and displays the synthetic image on said display means.

In a further aspect of the present invention, said image pickup system comprises a prism consisting of a plurality of planes, said prism comprises a plane having transmission action and total internal reflection action, and light having passed through the prism is guided to an image pickup device by an optical element having a positive optical power.

In a further aspect of the present invention, said image pickup system comprises a decentered, rotationally asymmetric, reflecting surface with optical powers differing depending upon azimuthal angles.

In an image observation system according to one aspect of the present invention, a pair of the image observation apparatus in the structure described above are provided for the left and right eyes of the observer.

An image observation system according to one aspect of the present invention is an image observation system in which a pair of image observation devices are provided for the left and right eyes of an observer, each of said image observation devices comprising an image pickup system for forming an outside image on an image pickup device by an image pickup optical system, and a display system for guiding light from a display element displaying the outside image acquired by the image pickup system, to the observing eye by a display optical system and each of said image observation devices being arranged so that an outside optical axis of the image pickup optical system is approximately aligned with an extension line of an eye-side optical axis of the display optical system, wherein the image pickup device of the image pickup system of each image observation device is shifted horizontally by a predetermined distance relative to the optical axis of the image pickup optical system, wherein the display element of each image observation device is shifted horizontally by a predetermined distance relative to the optical axis of the display optical system, and wherein the optical axes of the image pickup optical systems and the optical axes of the display optical systems in the pair of image observation devices for the left and right eyes are parallel to each other.

In a further aspect of the present invention, focus positions of said image pickup optical systems for the left and right eyes are matched with each other, shift amounts of said image pickup devices are set so as to match positions conjugate with centers of the respective image pickup devices by the image pickup optical systems for the left and right eyes with each other, positions of virtual images of said display elements by the display optical systems for the left and right eyes are matched with each other, and shift amounts of the display elements are set so as to match positions conjugate with centers of the respective display elements by the display optical systems for the left and right eyes with each other.

In a further aspect of the present invention, said focus positions are matched with said positions of the virtual images.

In a further aspect of the present invention, an angle of image pickup view of the outside image by said image pickup system of each image observation device is approximately equated to an angle of display view of display by said display system.

In a further aspect of the present invention, the image observation system comprises image generating means for generating an image and image combining means for combining images, and said image combining means combines the image from the image generating means with the image from said image pickup system of each image observation device to obtain a synthetic image and displays the synthetic image on said display element of each image observation device.

In a further aspect of the present invention, said image pickup optical system of each image observation device comprises a prism consisting of planes, said prism comprises a plane having transmission action and total internal reflection action, and an optical element having a positive optical power is placed in an optical path between the prism and said image pickup device.

In a further aspect of the present invention, said image pickup optical system of each image observation device comprises a decentered, rotationally asymmetric, reflective surface with optical powers differing depending upon azimuthal angles.

In a further aspect of the present invention, said display optical system of each image observation device comprises a decentered, rotationally asymmetric, reflecting surface with optical powers differing depending upon azimuthal angles.

In a further aspect of the present invention, said image pickup optical systems are zooming optical systems.

In a further aspect of the present invention, the image observation system comprises image processing means for changing a display magnification when the outside images acquired by said image pickup systems are displayed on said display elements.

An image observation system according to one aspect of the present invention is an image observation system in which a pair of image observation devices are provided for the left and right eyes of an observer, each of said image observation devices comprising an image pickup system for forming an outside image on an image pickup device by an image pickup optical system, and a display system for guiding light from a display element displaying the outside image acquired by the image pickup system, to the observing eye by a display optical system and each of said image observation devices being arranged so that an outside optical axis of the image pickup optical system is approximately aligned with an extension line of an eye-side optical axis of the display optical system via an optical member, wherein the image pickup device of the image pickup system of each image observation device is arranged so that a center thereof is shifted by a predetermined distance in a direction perpendicular to the optical axis of the image pickup optical system and wherein the display element of each image observation device is arranged so that a center thereof is shifted by a predetermined distance in a direction perpendicular to the optical axis of the display optical system.

In a further aspect of the present invention, the outside optical axes of said pair of image pickup optical systems for the left and right eyes are parallel to each other.

In a further aspect of the present invention, positions of an object formed on said image pickup devices by said image pickup systems are matched with positions where virtual images of said display elements are formed by said display systems.

In a further aspect of the present invention, object-side positions of centers of said image pickup devices by said image pickup systems are matched with positions where virtual images of centers of said display elements are formed by said display systems.

In a further aspect of the present invention, said image pickup optical system of each image observation device comprises a decentered, rotationally asymmetric, reflecting surface with optical powers differing depending upon azimuthal angles.

In a further aspect of the present invention, said display optical system of each image observation device comprises a decentered, rotationally asymmetric, reflecting surface with optical powers differing depending upon azimuthal angles.

In a further aspect of the present invention, a position of an entrance pupil of said image pickup optical system of each image observation device is shifted toward the outside from a position equivalent to an entrance pupil of the observer's eye.

In a further aspect of the present invention, where an amount of the shift of the entrance pupil of said image pickup optical system from the position equivalent to the position of the entrance pupil of said observer's eye is d, the shift amount d satisfies the following condition:

$$d \leq 60 \text{ (mm)}.$$

DETAILED DESCRIPTION OF THE PREFERRED EMBODIMENTS

Embodiment 1

Figure 1:
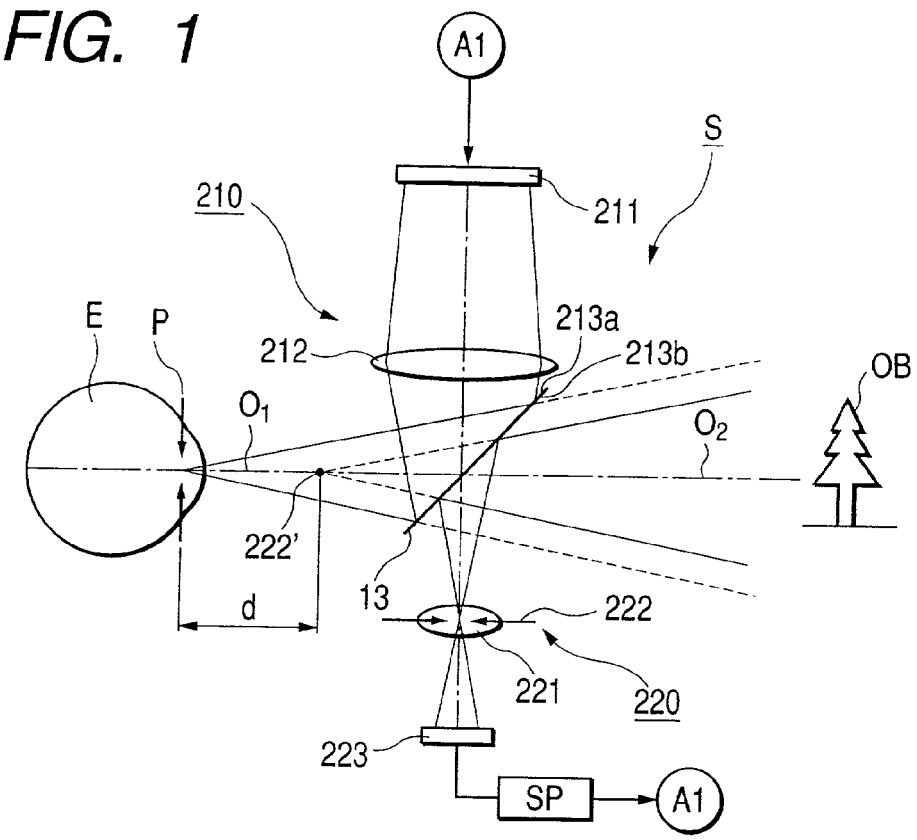
FIG. 1 is a schematic diagram to show the main part of Embodiment 1 of the present invention.

FIG. 1 is a schematic diagram to show the main part of Embodiment 1 of the image observation apparatus according to the present invention. The image observation apparatus S according to the present embodiment has a display system 210 for guiding image information displayed on a display means 211 to an observing eye E, and an image pickup system 220 for imaging image information OB in the outside on an image pickup device 223. The image information acquired by the image pickup system 220 is subjected to signal processing by a signal processing means SP to be converted into an electric signal and thereafter is displayed on the display means 211 of the display system 210 to be observed, together with the other image information displayed on the display means 211, by the observing eye E.

The display system 210 has the display means 211 such as an LCD, an EL panel, or the like, an eyepiece optical system 212, and a mirror 213. The image pickup system 220 has the mirror 213, an image pickup optical system 221 having a positive optical power, and the image pickup device 223 such as a CCD or the like.

First, the structure of the display system 210 will be described below. In the present embodiment, display light based on the image information and emerging from the display means 211, which is composed, for example, of a backlight, a polarizer, a transmissive liquid crystal device, etc., travels through the eyepiece optical system 211, and is reflected by a surface 213a of the mirror 213 on the side of the display system 210 to be guided to the entrance pupil P of the observing eye E. The position, the focal length, etc. of the eyepiece optical system 212 are determined so as to form an enlarged virtual image of the display element surface of the display means 211, for example, 2 m ahead, and the position of exit pupil of the eyepiece optical system 211 is matched with the position of entrance pupil P of the observing eye E.

The image pickup system 220 will be described next. Light from the object OB in the outside is reflected by a surface 213b of the mirror 213 on the side of the image pickup system 220 to be focused on the image pickup device 223 by the image pickup optical system 221. The outside optical axis $O_2$ of the image pickup system 220 is approximately aligned with an extension line of the optical axis $O_1$ of the display system 210 on the side of the observing eye E. Numeral 222 designates an entrance pupil of the imaging optical system 221.

The outside image information picked up by the image pickup system 220 is processed by the signal processing means SP to be converted into an electric signal and thereafter it is displayed on the display means 211 and guided to the observing eye E by the display system 210. The apparatus is constructed so as to permit the observer to observe the outside object OB as if to see it by the naked eye.

At this time, particularly, the angle of image pickup view of the outside image by the image pickup system 220 (which is determined by the size of the image pickup device 223, the focal length of the imaging optical system 221, and the positional relation between them) is approximately matched with the angle of display view of the display system 210 (which is determined by the size of the display element of the display means 211, the focal length of the eyepiece optical system 212, and the positional relation between them), whereby an outside observation magnification in the video seethrough observation (to observe the image information on the display means 211) is equated to that in the observation by the naked eye.

In the present embodiment, another potential configuration is such that the angle of image pickup view of the image pickup system 220 is preliminarily set slightly larger than the angle of display view of the display system 210, part of the outside image taken by the image pickup system is cut off so as to make the angle of view equal to the angle of display view of the display system, and the outside image thus cut is displayed on the display means 211 of the display system 210, thereby permitting 1:1 observation of the two images.

Figure 10:
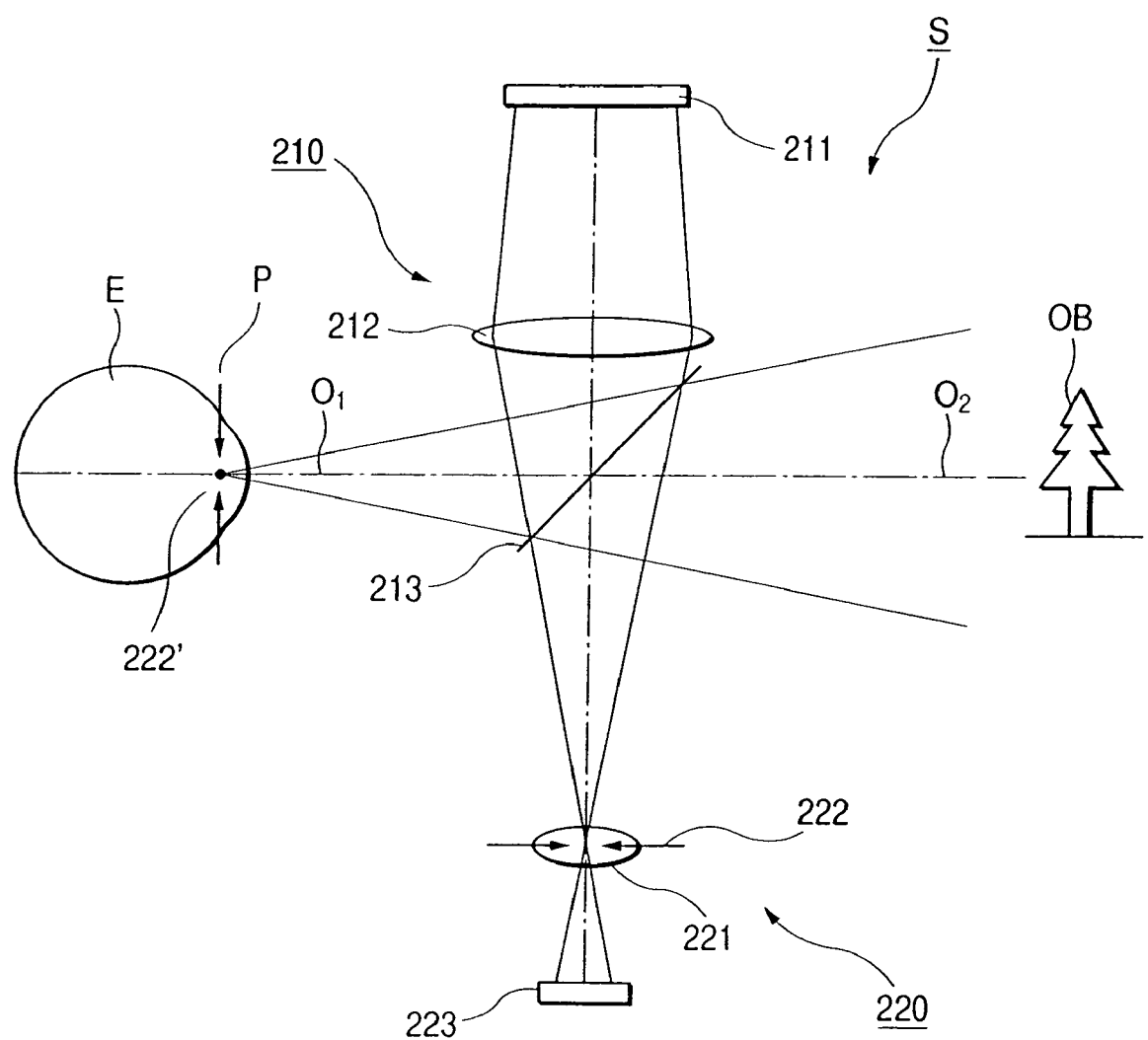
FIG. 10 is a schematic diagram to show the main part of the conventional image observation apparatus.

FIG. 10 is a schematic diagram to show the main part of a conventional image observation device. The elements having the same functions as those in the present embodiment illustrated in FIG. 1 are denoted by the same reference symbols and the description thereof is omitted herein.

As illustrated in FIG. 10, the conventional image observation device was constructed so that the entrance pupil 222 of the imaging optical system 221 of the image pickup system 220 was located at the position optically equivalent to the entrance pupil P of the observing eye E. Numeral 222' denotes a mirror image of the entrance pupil 222 of the imaging optical system 221 formed by the mirror 213. When the outside is observed as displayed on the display means 211 by the device of this structure, there arises the problem that the object OB existing in the outside is perceived in the size a little smaller than that in the case of the observation by the naked eye.

In order to solve this problem, the present invention involves such arrangement that the imaging optical system 221 and the image pickup device 223 of the image pickup system 220 are shifted toward the outside from the positions thereof in the conventional device (FIG. 10) (i.e., they are moved toward the mirror 213), as illustrated in FIG. 1; that is, the entrance pupil position 222 of the image pickup optical system 221 of the image pickup system 220 is shifted by a shift amount d toward the outside up to a point 222' relative to the entrance pupil position P of the ocular optical system of the observer, thereby solving the problem.

This configuration allows the perception of the size of the object to agree with that in the observation by the naked eye while maintaining the positional relation of the outside space, thereby permitting the observation of the outside without uncomfortable feeling. Since the optical elements can be placed near the entrance pupil P, the optical systems can be realized in compact structure.

In the present embodiment, if this shift amount d is set too large, it will greatly affect the sense of distance of object in the space of distance close to the observer (for example, within about 300 mm), whereby the observer will feel that the object is located at the position closer than in the observation by the naked eye.

It is thus desirable that the shift amount d be not more than 60 mm and, preferably, not less than 5 mm and not more than 60 mm. Particularly, when the shift amount d is set in the range of not less than 10 mm nor more than 40 mm, the influence on the sense of distance becomes little perceived.

Embodiment 2

Figure 2:
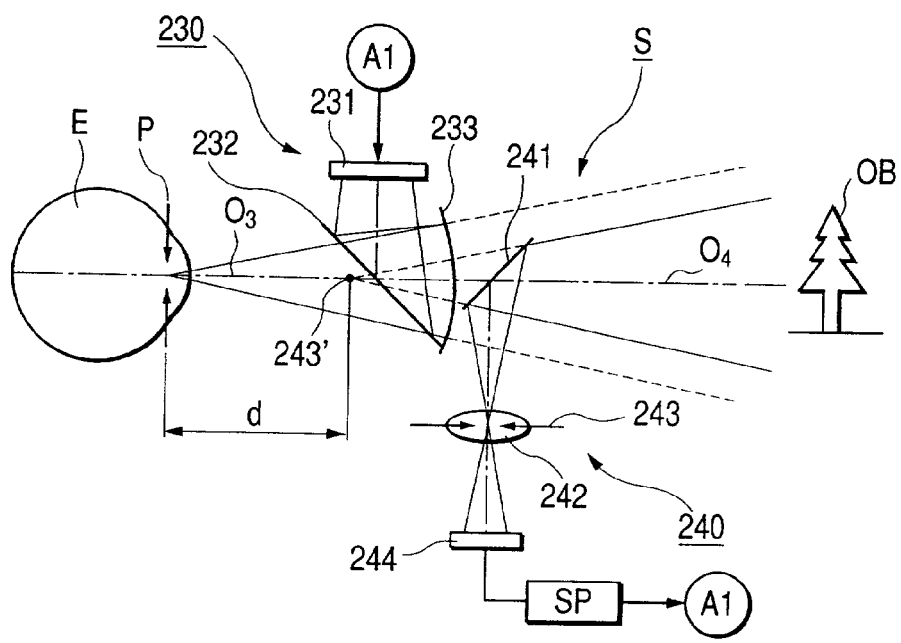
FIG. 2 is a schematic diagram to show the main part of Embodiment 2 of the present invention.

FIG. 2 is a schematic diagram to show the main part of Embodiment 2 of the image observation apparatus according to the present invention. The image observation apparatus S according to the present embodiment has the display system 230 for guiding the image information displayed on the display means 231 to the observing eye E, and the image pickup system 240 for imaging the image information of the outside on the image pickup device 244. The image information acquired by the image pickup system 240 is processed by the signal processing means SP to be converted into an electric signal and thereafter it is displayed on the display means 231 of the display system 230 to be observed, together with the other image information displayed on the display means 231, by the observing eye E.

The display system 230 has the display means 231 such as the LCD, the EL panel, or the like, a half-silvered mirror 232, and a concave mirror (eyepiece optical system) 233 of a spherical surface, an aspherical surface, or the like. The image pickup system 240 has a mirror 241, the image pickup optical system (optical element) 242 having a positive optical power, and the image pickup device 244 such as the CCD or the like.

In the present embodiment, the display light based on the image information and emerging from the display means 231, which is composed, for example, of the backlight, the polarizer, the transmissive liquid crystal element, etc., is reflected in part by the half-silvered mirror 232, the reflected light is then reflected by the concave mirror 233 and then transmitted in part by the half-silvered mirror 232 to be guided to the entrance pupil P of the observing eye E. The position, the focal length, etc. of the concave mirror 233 are determined so as to form an enlarged virtual image of the display element surface of the display means 231, for example, 2 m ahead, and the exit pupil thereof is matched with the entrance pupil P of the observing eye E.

On the other hand, the light from the object OB in the outside is reflected by the mirror 241 to be focused on the image pickup device 244 by the imaging optical system 242. The outside optical axis $O_4$ of the image pickup system 240 is approximately aligned with an extension line of the optical axis $O_3$ of the display system 230 on the side of the observing eye E.

The outside image information picked up by the image pickup system 240 is displayed on the display means 231 to be guided to the observing eye E by the display system 230, whereby the observer can observe the outside as if to see it by the naked eye.

The entrance pupil 243 of the imaging optical system 242 (numeral 243' indicating a mirror image of the entrance pupil 243 formed by the mirror 241) is shifted by the distance d toward the outside relative to the entrance pupil P of the observing eye E, thereby permitting the observation of the outside without uncomfortable feeling for the reason similar to that described in Embodiment 1.

Embodiment 3

Figure 3:
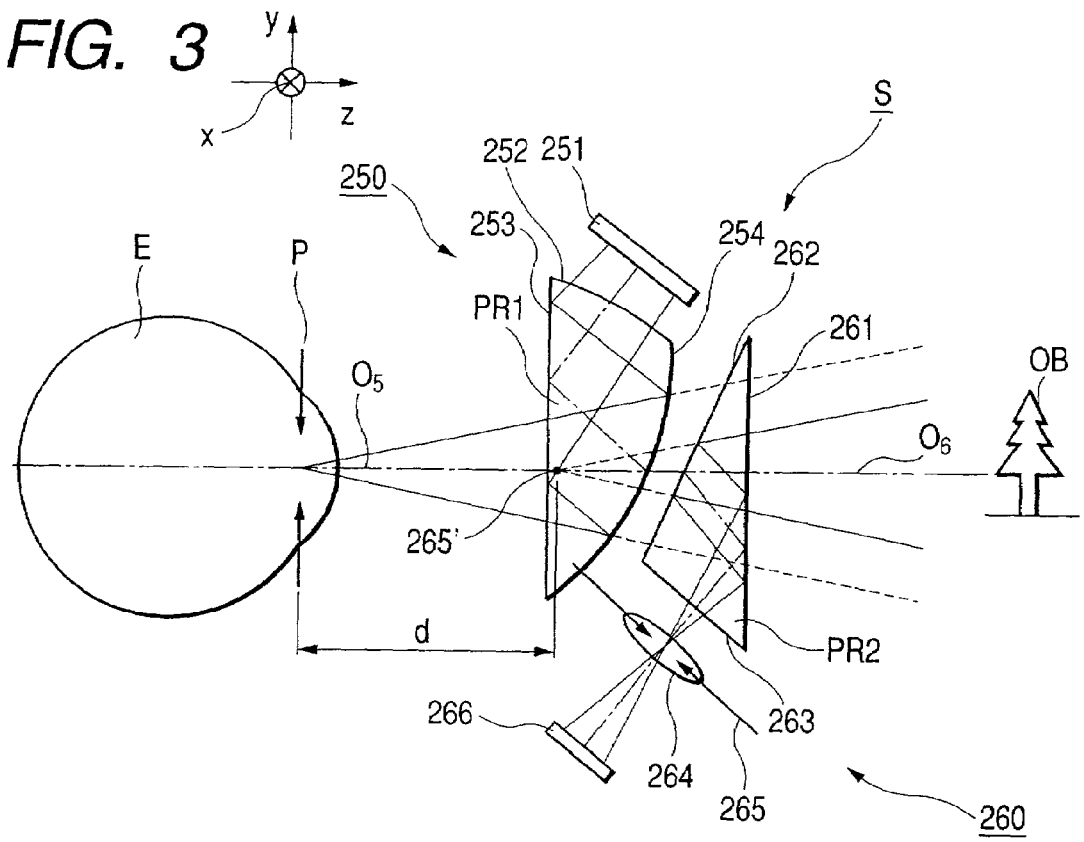
FIG. 3 is a schematic diagram to show the main part of Embodiment 3 of the present invention.

FIG. 3 is a schematic diagram to show the main part of Embodiment 3 of the image observation apparatus according to the present invention. The image observation apparatus S according to the present embodiment has the display system 250 for guiding the image information displayed on the display means 251 to the observing eye E, and the image pickup system 260 for imaging the image information OB of the outside on the image pickup device 266. The image information obtained by the image pickup system 260 is displayed on the display means 251 to be observed, together with the other image information displayed on the display means 251, by the observing eye E.

The display system 250 has the display means 251 such as the LCD, the EL panel, or the like, and a prism body PR1 having imaging action. The image pickup system 260 has a prism PR2 each surface of which is a plane, the image pickup optical system 264 having a positive optical power, and the image pickup device 266 such as the CCD or the like.

In the present embodiment, the outgoing display light based on the image information and emerging from the display means 251, which is composed, for example, of the backlight, the polarizer, the transmissive liquid crystal device, etc., is incident to the prism body PR1 while being refracted by a surface 252 of the prism body PR1. The incident light is then incident at angles of incidence over the critical angle to a surface 253 to be reflected totally. The reflected light is then reflected by a mirror surface 254 of a curved surface to be incident at angles of incidence below the critical angle to the surface 253. The light incident to the surface 253 emerges from the prism body PR1 while being refracted by the surface 253. The emergent light is then guided to the entrance pupil P of the observing eye E.

In order to correct well for aberration caused by the placement of the surface 254 with the optical power inclined relative to the optical axis $O_5$, the prism body PR1 is constructed of decentered, rotationally asymmetric surfaces with optical powers differing depending upon azimuthal angles, thereby reducing the size of the eyepiece optical system.

The position, the focal length, etc. of the prism body PR1 are determined so as to form an enlarged virtual image of the display element surface of the display means 251, for example, 2 m ahead, and the exit pupil thereof is matched with the entrance pupil P of the observing eye E.

On the other hand, the light from the object OB in the outside is incident to the prism PR2 while being refracted by the surface 261. The incident light is reflected by the mirror surface 262 and the reflected light is then incident at angles of incidence over the critical angle to the surface 261 to be reflected totally. The reflected light is then incident at angles of incidence below the critical angle to the surface 263. The light emerges from the prism PR2 while being refracted by the surface 263. The emergent light is then focused on the image pickup device 266 by the imaging optical system 264.

Although each of the surfaces of the prism PR2 is a plane, any one of them may be formed of a curved surface. The outside optical axis $O_6$ of the image pickup system 260 is approximately aligned with an extension line of the optical axis $O_5$ of the display system 250 on the side of the observing eye E.

The outside image information picked up by the image pickup system 260 is displayed on the display means 251 and is guided to the observing eye E by the display system 250, whereby the observer can observe the outside as if to see it by the naked eye.

Figure 4:
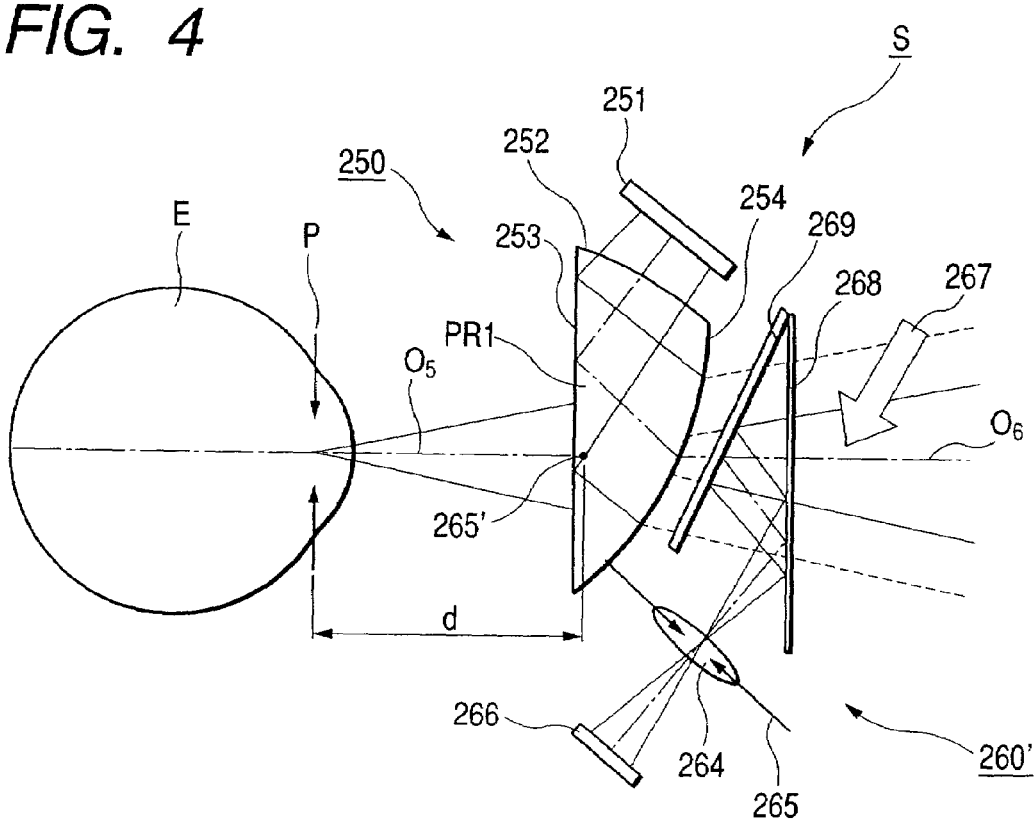
FIG. 4 is a schematic diagram to show the main part of an image observation device for comparison with the present invention.

In the present embodiment, if the optical system were constructed of mirror surfaces instead of the prism PR2, as illustrated in FIG. 4, i.e., if the optical system were constructed using a half-silvered mirror 268 in place of the surface 261 of the prism PR2 and similarly using a mirror 269 in place of the surface 262, stray light (for example, beam 267) from directions other than the image pickup directions would enter the image pickup device 266 to form a ghost image.

In order to solve it, the present embodiment is arranged so that the total internal reflection condition is met on the occasion of reflection of light at the surface 261 with the transmission and reflection action in the prism PR2. This can prevent the light from the directions other than the image pickup directions from entering the image pickup device 266, further permits folding of the optical axis $O_6$ to increase degrees of freedom of the layout of the optical system, and also permits reduction in the size of the apparatus.

Use of total internal reflection permits the outside light to be guided efficiently to the image pickup device 266, thereby obtaining a bright image.

Figure 5:
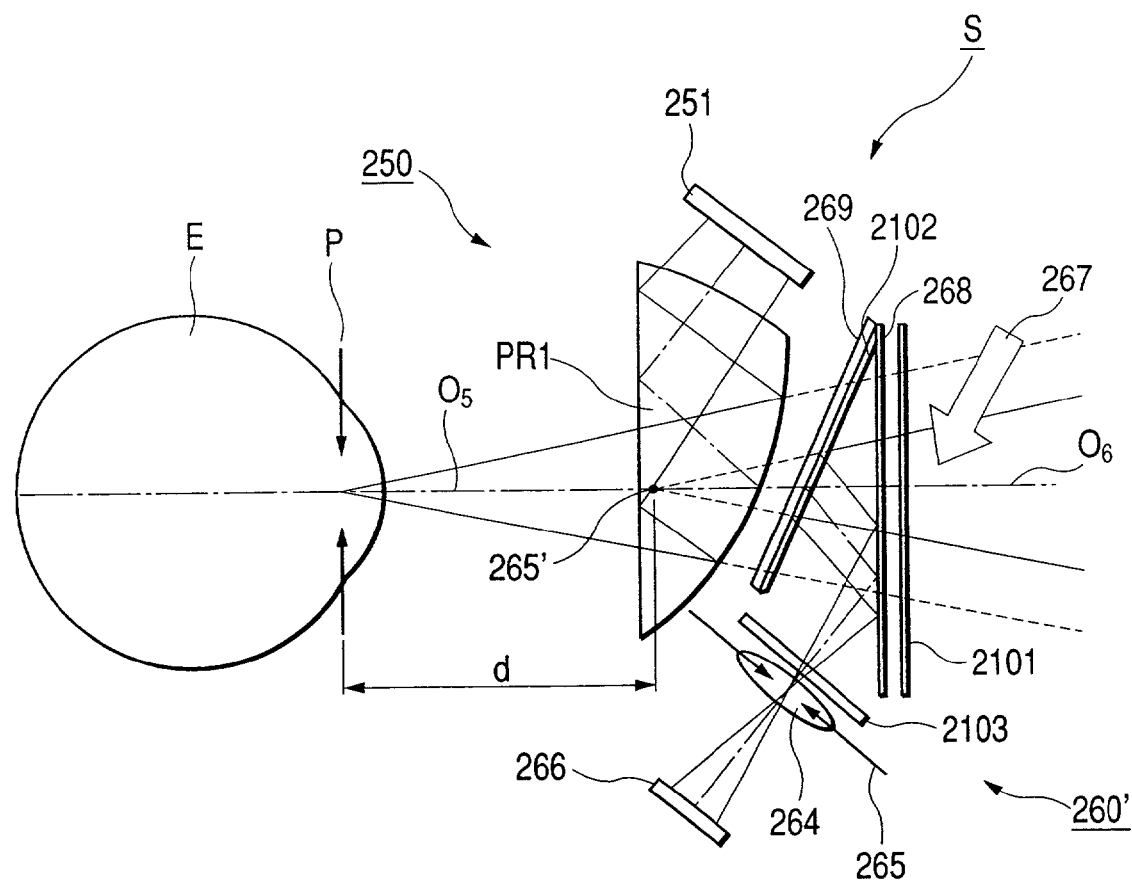
FIG. 5 is a schematic diagram to show the main part of a modification obtained by modifying part of Embodiment 3 of the present invention.

In the present embodiment the apparatus may also be constructed in such structure, as illustrated in FIG. 5, that a polarizer 2101 is placed on the outer side of the half-silvered mirror 268, that a quarter wave plate 2102 is on the outer side of the mirror 269, and that a polarizer 2103, the axis of absorption of which is set perpendicular to that of the polarizer 2101, is placed immediately in front of the image pickup optical system 264. This structure can prevent the beam 267 from entering the image pickup device 266.

Since the light from the image pickup directions travels through the quarter wave plate 2102 twice, the direction of polarization of the light is rotated by 90° and the light travels through the polarizer 2103 to be guided to the image pickup device 266 by the imaging optical system 264. The occurrence of the ghost image can be avoided by constructing the image pickup optical system using the half-silvered mirror as described above, but this structure requires the expensive device such as the wave plate, and also tends to be complex.

The entrance pupil 265 of the image pickup optical system 264 (numeral 265' indicating an image of the entrance pupil 265 formed by the prism PR2) is shifted by the distance d toward the outside relative to the entrance pupil P of the observing eye E, thereby permitting the observation of the outside without uncomfortable feeling for the reason similar to that discussed in Embodiment 1.

The present embodiment enables the entire apparatus to be constructed in compact structure, by setting the folding (deflecting) direction of the optical axis of the image pickup system 260 to the direction different from that of the display system 250 as illustrated in FIG. 3. These folding directions do not always have to be opposite to each other, but they may be set, for example, to mutually orthogonal directions as illustrated in FIG. 6.

Figure 6:
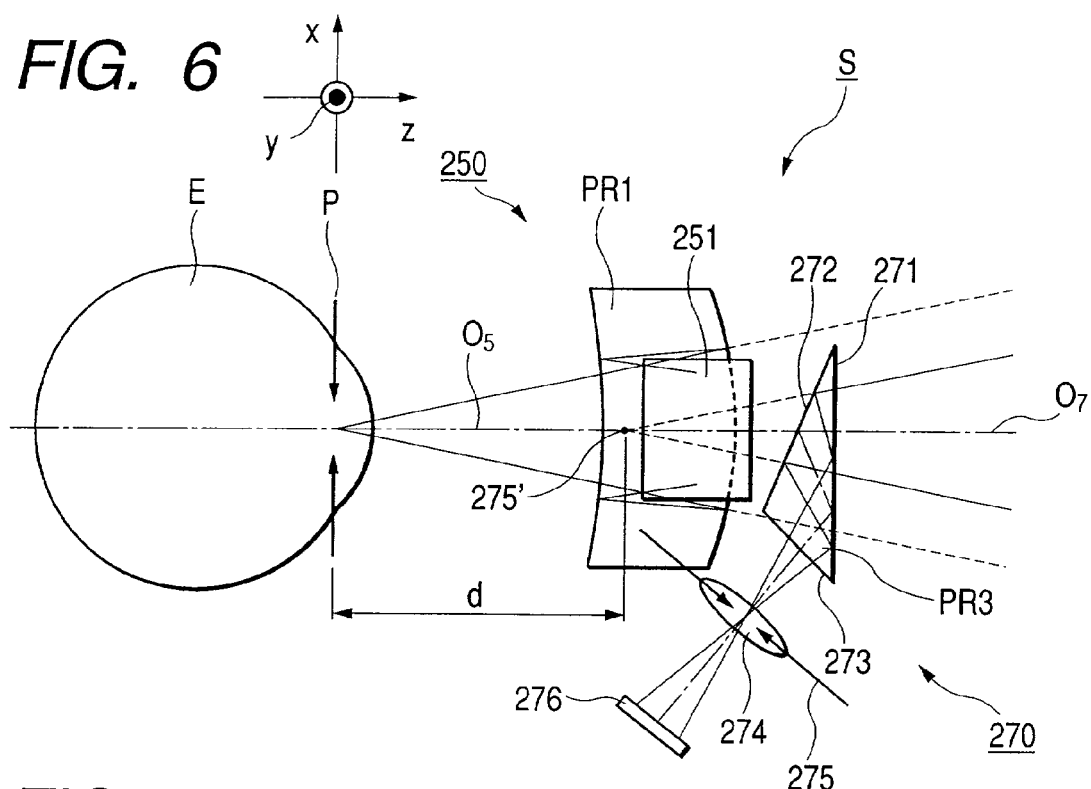
FIG. 6 is a schematic diagram to show the main part of a modification obtained by modifying part of Embodiment 3 of the present invention.

In FIG. 6 the display system 250 has the same function as in Embodiment 3 illustrated in FIG. 3. On the other hand, the light from the object OB in the outside is incident to the prism PR3 while being refracted by the surface 271. The incident light is then reflected by the mirror surface 272 and the reflected light is incident at angles of incidence over the critical angle to the surface 271 to be reflected totally. The reflected light is then incident at angles of incidence below the critical angle to the surface 273 to emerge from the prism PR3 while being refracted thereby. The emergent light is focused on the image pickup device 276 by the imaging optical system 274.

Embodiment 4

Figure 7:
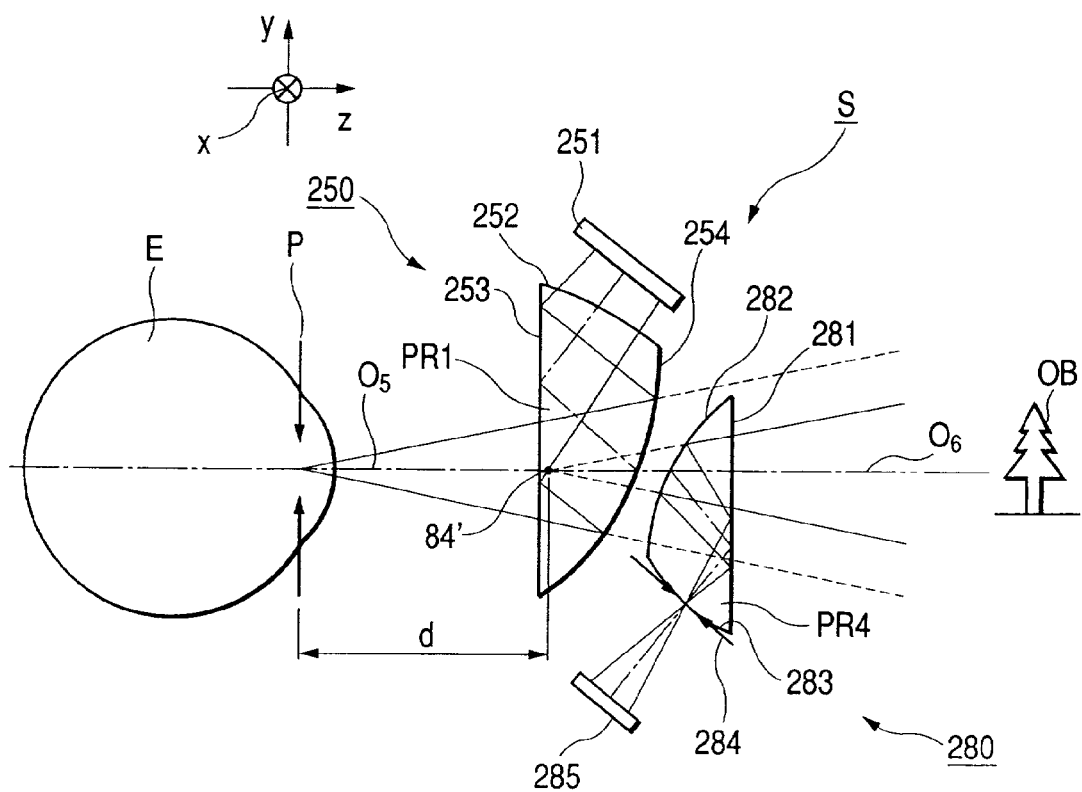
FIG. 7 is a schematic diagram to show the main part of Embodiment 4 of the present invention.

FIG. 7 is a schematic diagram to show the main part of Embodiment 4 of the image observation apparatus according to the present invention. The present embodiment is different from Embodiment 3 of FIG. 3 only in that the image pickup system 280 replaces the image pickup system 260, and the other structure is the same.

In FIG. 7 the display system 250 has the same function as in Embodiment 3 illustrated in FIG. 3. The light from the object OB in the outside is incident to the prism body PR4 while being refracted by a surface 281. The incident light is then reflected by a mirror surface 282 of a curved surface and the reflected light is again incident at angles of incidence over the critical angle to the surface 281 to be reflected totally. The reflected light is then incident at angles of incidence below the critical angle to a surface 283 to emerge from the prism body PR4 while being refracted by the surface 283. The emergent light is then focused on the image pickup device 285.

In order to correct well for the aberration caused by the placement of the curved surface 282 with optical power inclined, the prism body PR4 is constructed of decentered, rotationally asymmetric surfaces with optical powers differing depending upon azimuthal angles, thereby realizing the image pickup optical system in the compact structure.

The entrance pupil 284 of the image pickup optical system (PR4) is shifted by the distance d toward the outside relative to the entrance pupil P of the observing eye E, thereby permitting the observation of the outside without uncomfortable feeling for the reason similar to that discussed in Embodiment 1.

Figure 8A:
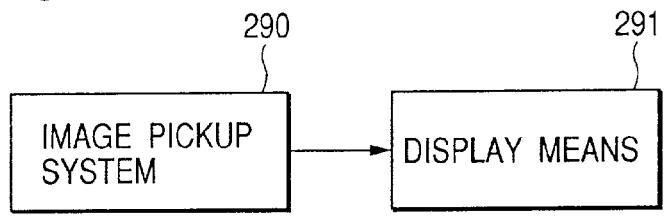
FIG. 8A and FIG. 8B are block diagrams to show the main part of a signal processing step in the image observation apparatus of the present invention.
Figure 8B:
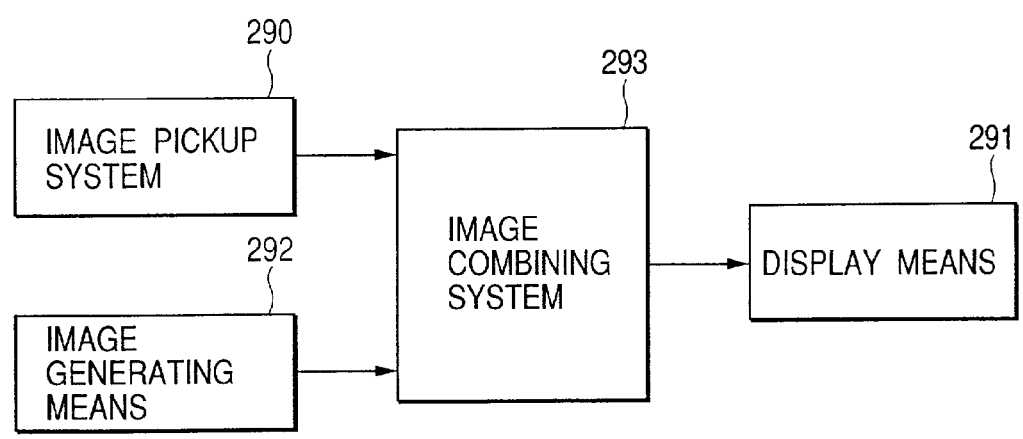

FIGS. 8A and 8B are block diagrams to show the main part of signal processing in the image observation apparatus of the present invention. In the present invention, the image displayed on the display means 291 can be a display of the outside image information as it is acquired by the image pickup system 290, as illustrated in FIG. 8A, but a synthetic image may also be displayed on the display means 291 by combining the outside image information acquired by the image pickup system 290 with image information generated by an image generating means 292 (which is an image generated by computer graphics or the like, an image recorded by a video system or the like, etc.) in an image combining means 293, as illustrated in FIG. 8B.

Figure 9:
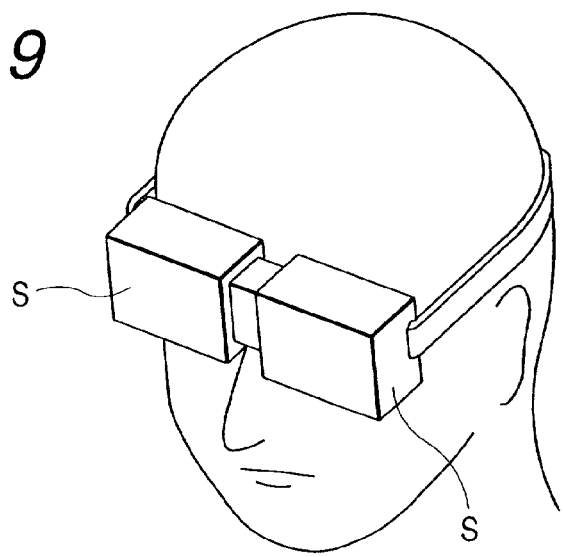
FIG. 9 is a schematic diagram to show the main part of the image observation system of the present invention.

When a pair of image observation devices S as described in either of the above embodiments are provided for the left and right eyes of the observer as illustrated in FIG. 9, stereoscopic vision can be presented by use of binocular parallax, whereby an image observation system can be constructed with performance to permit the observer to observe the outside in a more natural state.

In the above embodiments, the display element was the transmissive liquid crystal device, but it can be a reflective liquid crystal device or a self-emissive device such as the EL device or the like.

FIGS. 11 to 15B are explanatory diagrams to illustrate the basic concept of the image observation system of the present invention. The image observation system according to the present invention is provided with a pair of image observation devices each having the display system 20 and the image pickup system 10, for the left and right eyes of the observer. Each member for the right eye is accompanied by suffix R, while each member for the left eye by suffix L. E represents the observing eyes of the observer.

Figure 11:
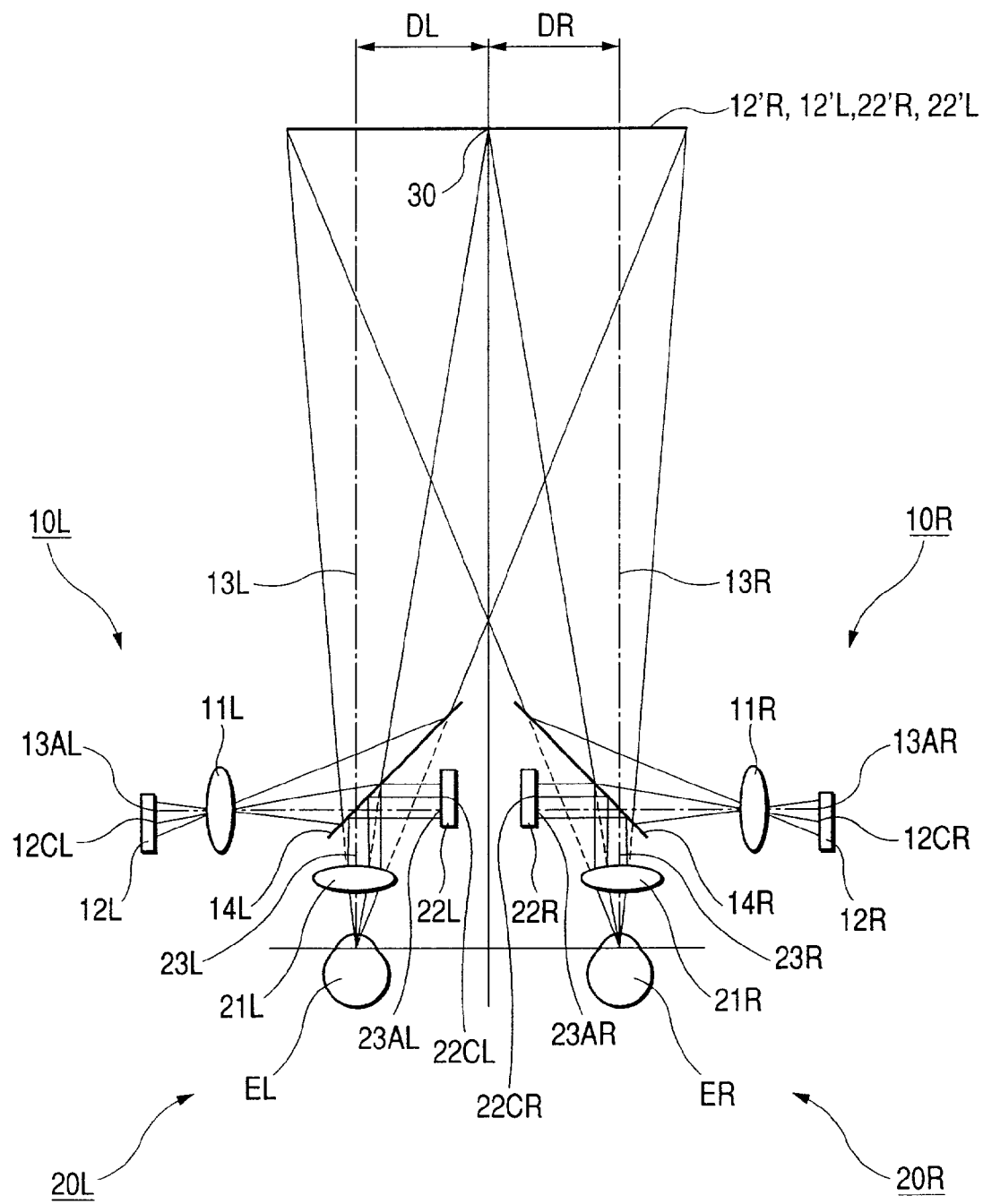
FIG. 11 is an explanatory diagram to illustrate the basic concept of the image observation system of the present invention.

In FIG. 11, each display system 20 (20L, 20R) has the display optical system 21 (21L, 21R) and the display element 22 (22L, 22R) and numeral 23 (23L, 23R) designates the eye-side optical axis of the display optical system 21. The optical axes 23R, 23L of the display optical systems 21 for the left and right eyes are set in parallel to each other.

Each mirror 14 (14L, 14R) separates optical paths of the image pickup system 10 (10L, 10R) from those of the display system 20.

The position, the focal length, etc. of the display optical systems 21 are determined so as to form an enlarged virtual image of the display element surface of the display element 22, for example, 2 m ahead of the observing eye E. Each plane 22' (22'L, 22'R) is a virtual screen (a virtual image screen) which is conjugate with the display surface of the display element 22 with respect to the display optical system 21 and on which a virtual image is formed.

Each display element 22 is positioned so that the center 22C thereof (22CL, 22CR) is shifted from an intersection 23A (23AL, 23AR) between the optical axis 23 of the display optical system 21 and the display element 22. The shift amount of the centers 22C is set so that the centers of the virtual image screens 22'R, 22'L of the display systems 20R, 20L for the left and right eyes are matched at a point 30, and it is a distance D on the virtual image screens 22'.

The shift directions are different between the display systems 20L, 20R for the left and right eyes and the distance D is half of the eye-to-eye distance of the observer. This matches the virtual image screens 22'R, 22'L of the display systems 20R, 20L for the left and right eyes with each other.

Each image pickup system 10 is comprised of the image pickup optical system 11 (11L, 11R) and the image pickup device 12 (12L, 12R), and numeral 13 (13L, 13R) designates the optical axis of the image pickup optical system on the exterior side. The optical axes 13R, 13L of the image pickup optical systems for the left and right eyes are set in parallel to each other and are approximately aligned with the optical axes 23R, 23L of the respective display optical systems for the left and right eyes. Each image pickup optical system 11 forms an image of the outside on the image pickup device 12.

Each surface 12' is a focal plane at the position conjugate with the image pickup device 12 with respect to the image pickup optical system 11.

Each image pickup optical system 11 consists of an optical system with a deep depth of field, so that an object before and after the focal plane 12'R, 12'L is imaged in focus on the image pickup device 12. Each image pickup device 12 is designed so that the center 12C (12CL, 12CR) thereof is shifted from an intersection 13A (13AL, 13AR) between the optical axis 13 of the image pickup optical system and the image pickup device 12. The shift amount of the centers is set so that the centers of the focal planes 12'R, 12'L of the image pickup systems 10R, 10L for the left and right eyes are matched at the point 30, and it is the distance D on the focal planes 12'.

The shift directions are different between the image pickup systems 10L, 10R for the left and right eyes, and the distance D is half of the eye-to-eye distance of the observer. This matches the focal planes 12'R, 12'L of the image pickup systems 10R, 10L for the left and right eyes with each other.

Figure 12:
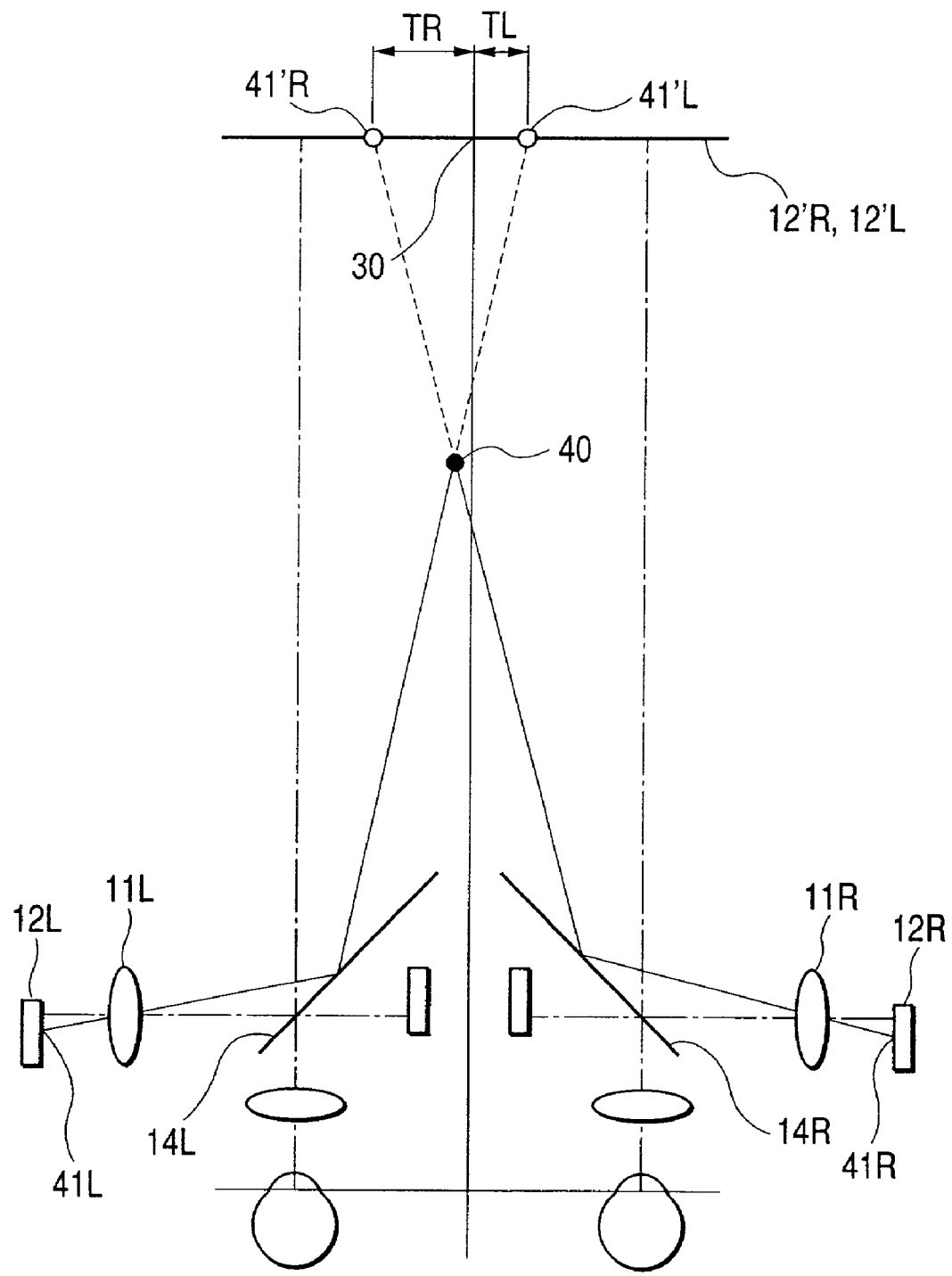
FIG. 12 is an explanatory diagram to illustrate the image pickup systems of FIG. 11.
Figure 13:
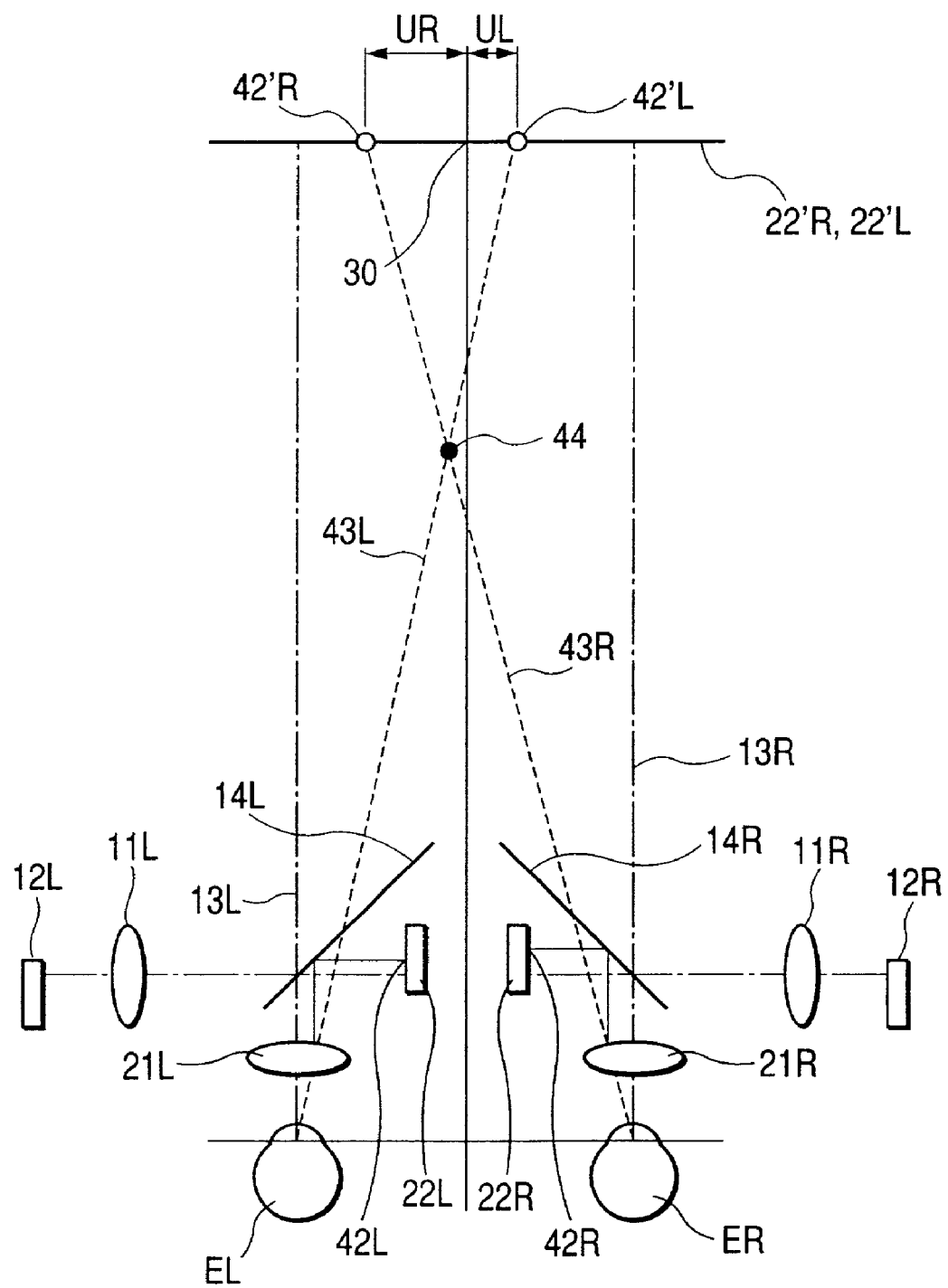
FIG. 13 is an explanatory diagram to illustrate the display systems of FIG. 11.

FIG. 12 and FIG. 13 are diagrams to show states of image pickup, display, and observation of the object 40 in the outside space. In FIG. 12, images 41 (41L, 41R) of the object 40 in the outside space are formed on the image pickup devices 12 (12L, 12R) by the mirrors 14 and the image pickup optical systems 11, and are picked up. The positions of the images are indicated by 41' (41'L, 41'R) on the focal planes 12' conjugate with the image pickup devices 12 (12L, 12R) and they are located at the distances of T (TL, TR) from the center 30 of the focal planes.

The images 41 of the object 40 within the depth of field, which were picked up by the image pickup systems 10, are displayed as images 42 on the display elements 22 as illustrated in FIG. 13. In FIG. 13, light from each display element 22 is guided to the observing eye E by the mirror 14 and the display optical system 21. The images 42 are observed as images 42' on the virtual image screens 22' conjugate with the display elements 22, by the corresponding observing eyes E. The positions of the images 42' are distances of U (UL, UR) apart from the center 30 of the virtual image screens.

The observer observes the image 42'R by the right eye ER and the image 42'L by the left eye EL. This permits the observer to observe the object 40 as if the object actually exists at an intersection 44 between the visual axis 43R of the right eye ER and the visual axis 43L of the left eye EL (stereoscopic observation).

Since this structure permits the overlapping range between the observation fields of the left and right eyes to be set large, it can avoid difficulties in observation due to occurrence of binocular rivalry. Further, even in the cases wherein the image pickup optical systems 11 are composed of zoom lenses and undergo zooming or in the cases wherein the display magnification is altered by use of an electronic zoom or the like, the structure prevents the reproduced space from being distorted and permits the observer to conduct the fusion of left and right images successfully without stress.

Figure 14:
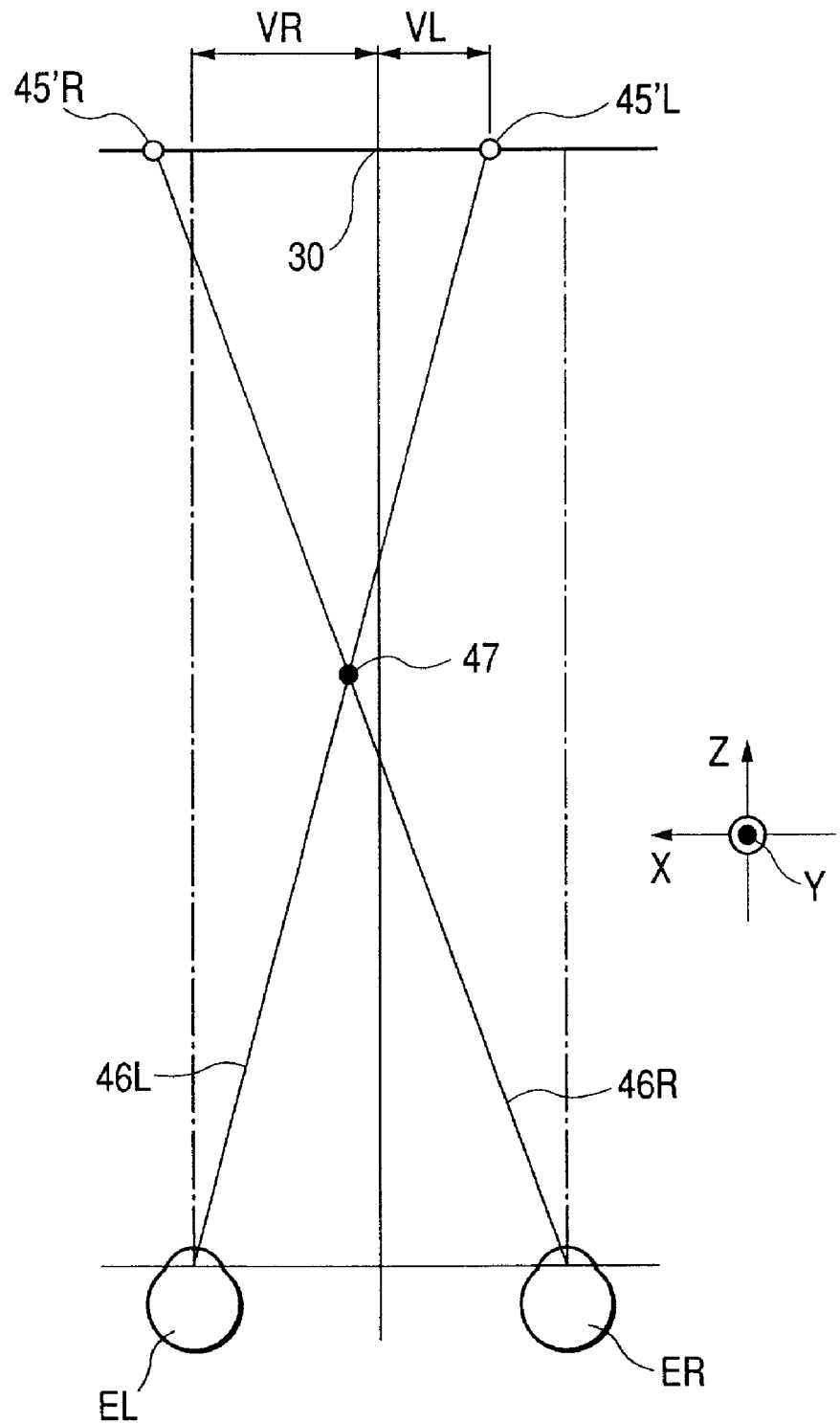
FIG. 14 is an explanatory diagram to illustrate the image pickup systems of FIG. 11.
Figure 15A:
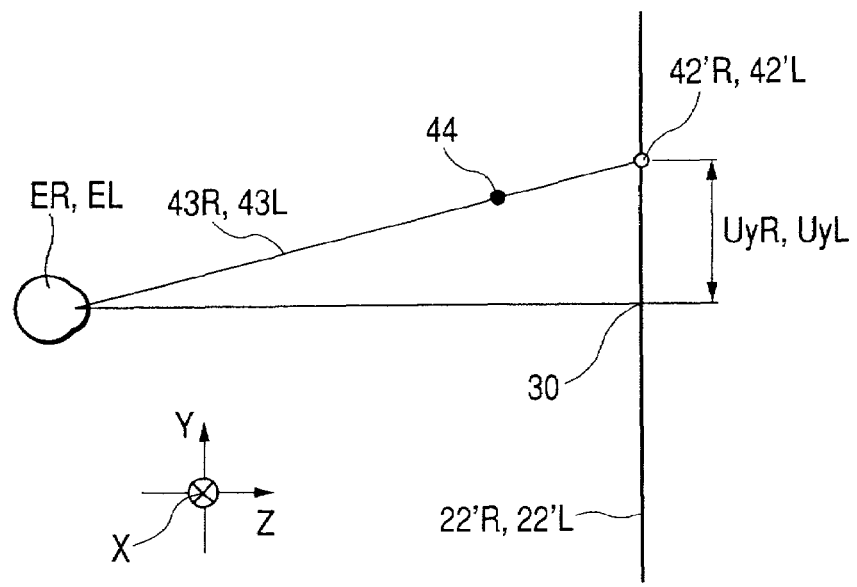
FIG. 15A and FIG. 15B are explanatory diagrams to illustrate the display systems of FIG. 11.
Figure 15B:
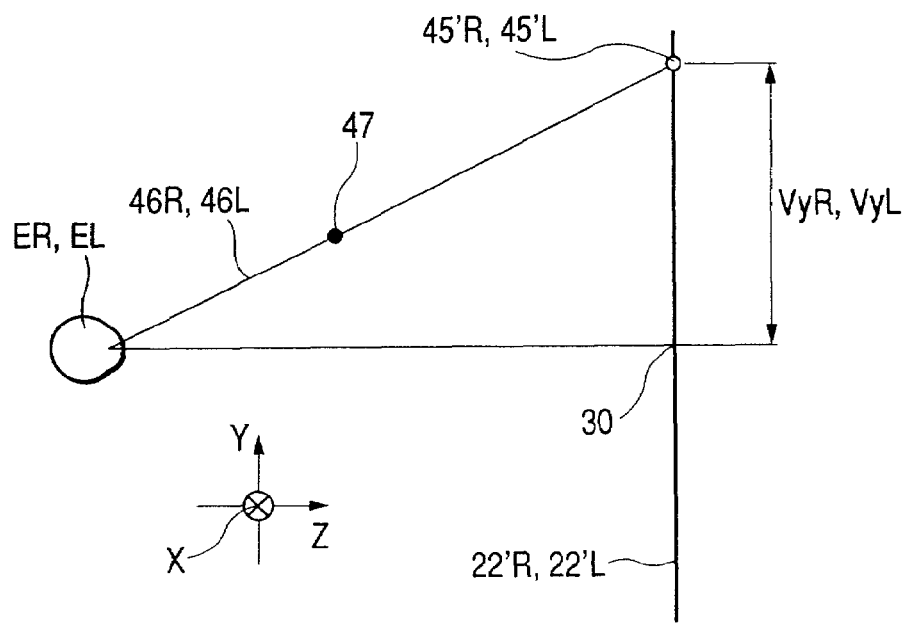

The description will be continued with reference to FIG. 14, FIG. 15A, and FIG. 15B. FIG. 14 is a case wherein the picked up images 41 by the image pickup systems 10, of the object 40 in the outside space, illustrated in FIG. 12, are displayed at the magnification of ×2 on the display elements 22. In this case, the distances V from the screen center 30, of the display images 45' on the virtual image screens 22' are twice the distances U in FIG. 13. Just as in the case of FIG. 13, the observer can observe the object 40 as if it is actually present at an intersection 47 between the visual axis 46R of the right eye ER and the visual axis 46L of the left eye EL.

In the image observation system according to the present invention, different from the conventional systems, the visual axes of the left and right eyes intersect with each other (to permit the fusion of left and right images) even if the object 40 is not present in the XZ plane (Y ≠0). FIG. 15A is a YZ cross section in the state illustrated in FIG. 13, and FIG. 15B a YZ cross section in the state illustrated in FIG. 14.

In FIGS. 15A and 15B, the suffix y attached to U and V represents a Y-directional component thereof. As illustrated in FIGS. 15A and 15B, the virtual image screens of the left and right eyes are always matched with respect to the Z-direction. Therefore, independent of the position of the object 40, the distance UyR and the distance UyL are always equal and the distance VyR and the distance VyL are always equal to each other. Regardless of whether the zooming function is used or not, the visual axes 43R and 43L and the visual axes 46R and 46L of the left and right eyes ER, EL are matched in the YZ plane, as illustrated in FIGS. 15A and 15B, and thus they intersect with each other, thus permitting the fusion of the left and right images.

In FIG. 12 and FIG. 13, when the entrance pupil position of each image pickup optical system 11 is matched with the entrance pupil position of the corresponding observing eye E and when the angle of image pickup view is matched with the angle of display view, the position and size of the focal planes 12' of the image pickup systems become equal to those of the virtual image screens 22' of the display systems 20, so that the distances T become equal to the distances U.

Therefore, the position of the intersection 44 becomes identical to the actual position of the object 40 in the outside space and the size of the reproduced object also becomes equal to that of the object 40.

Even in the cases wherein the entrance pupil positions of the image pickup optical systems 11 are not matched with the entrance pupil positions of the observing eyes E or in the cases wherein the angle of image pickup view is not matched with the angle of display view, the reproduced space is free of distortion and the observer can succeed in the fusion of the left and right images for the reason illustrated in FIGS. 15A and 15B.

In the example described above, the focal planes 12' (12'R, 12'L) of the image pickup systems are matched with the virtual image screens 22' (22'R, 22'L) of the display systems 20, but the present invention is not limited to this.

When the focal planes 12'R and 12'L of the image pickup systems 10 for the left and right eyes are matched with each other and when the virtual image screens 22'R and 22'L of the display systems 20 for the left and right eyes are matched with each other, the y-directional picking-up image heights TyR and TyL of the image pickup systems 10 for the left and right eyes become matched with each other and the y-directional display image heights UyR and UyL of the display systems 20 for the left and right images also with each other, whereby the reproduced space is free of distortion and the observer can succeed in the fusion of the left and right images without stress for the reason illustrated in FIGS. 15A and 15B.

Specific embodiments of the present invention will be described below.

Embodiment 5

Figure 16:
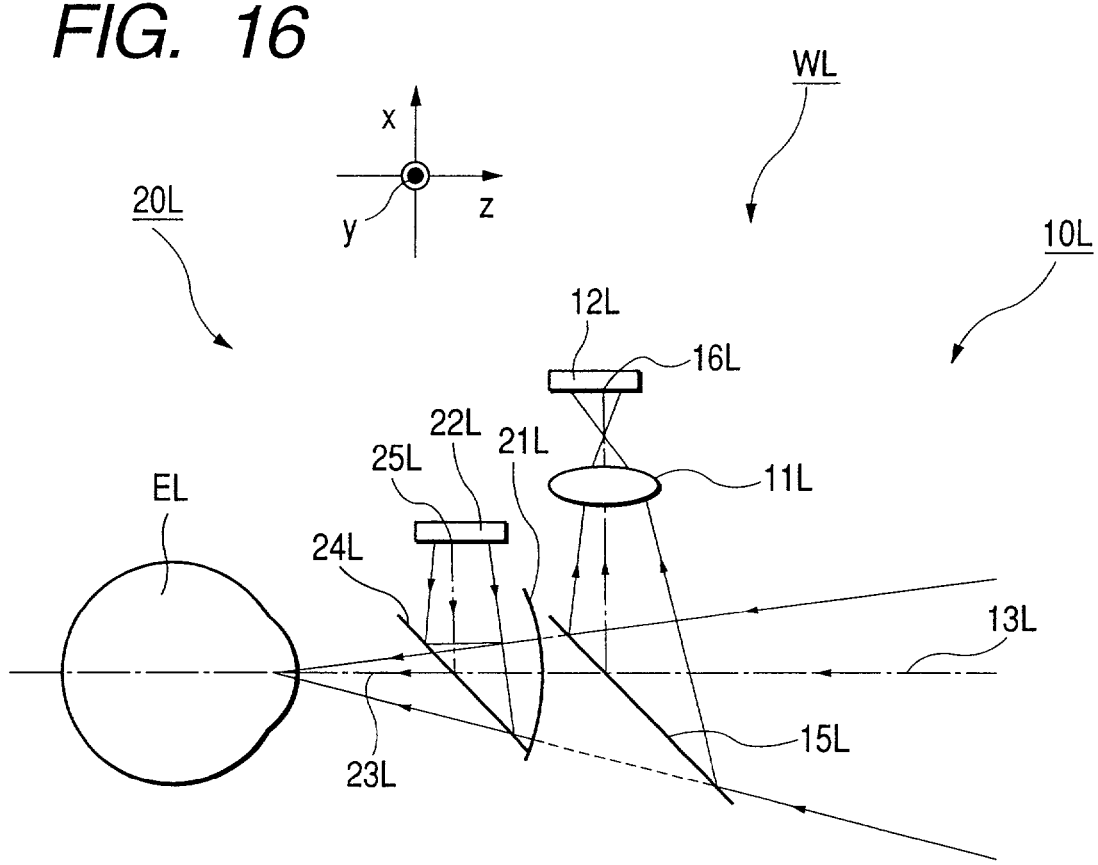
FIG. 16 is a schematic diagram to show the main part of Embodiment 5 of the image observation system of the present invention.

FIG. 16 is a schematic diagram to show the main part of Embodiment 5 of the image observation system according to the present invention. FIG. 16 shows an image observation device WL for the left eye in the image observation system of the present invention. Although each member for the left eye is illustrated with the suffix L in the drawing, the suffix will be omitted in the description below.

The image observation device W according to the present embodiment has the display system 20 for guiding the image information displayed on the display element 22 to the observing eye E, and the image pickup system 10 for imaging the image information of the outside on the image pickup device 12. The image information obtained by the image pickup system 10 is displayed on the display element 22 of the display system 20 and is observed by the observing eye E.

The display system 20 has the display element 22 such as the LCD, the EL panel, or the like, a half-silvered mirror 24, and a concave mirror 21, and numeral 23 designates the optical axis thereof. The image pickup system 10 has a mirror 15, the image pickup optical system 11 having a positive optical power, and the image pickup device 12 such as the CCD or the like, and numeral 13 designates the optical axis thereof.

In the present embodiment, the display light emerging from the display element 22, which is composed, for example, of the backlight, the polarizer, the transmissive liquid crystal device, etc., is reflected in part by the half-silvered mirror 24 and the reflected light is then reflected by the concave mirror 21 to be guided to the observing eye E. The position, the focal length, etc. of the concave mirror 21 are determined so as to form an enlarged virtual image of the display element 22, for example, 2 m ahead of the observer, and the exit pupil thereof is matched with the entrance pupil of the observing eye E. The center of the display element 22 is shifted by the amount illustrated in FIG. 11 from the intersection 25 between the display element 22 and the optical axis 23.

On the other hand, the light from the outside is reflected by the mirror 15 to be focused on the image pickup device 12 by the image pickup optical system 11. The optical axis 13 of the image pickup system is approximately aligned with the optical axis 23 of the display system. The center of the image pickup device 12 is shifted by the amount illustrated in FIG. 11 from the intersection 16 between the image pickup device 12 and the optical axis 13. The entrance pupil position of the image pickup optical system 11 is matched with the entrance pupil position of the observing eye E.

The outside image information picked up by the pickup system 10 is displayed on the display element 22 and is guided to the observing eye E by the display system 20, whereby the observer can observe the outside as if to see it by the naked eye.

In this case, particularly, when the angle of image pickup view of the outside image by the image pickup system 10 (which is determined by the size of the image pickup device 12, the focal length of the image pickup optical system 11, and the positional relation between them) is approximately matched with the angle of display view of the display system 20 (which is determined by the size of the display element 22, the focal length of the concave mirror 21, and the positional relation between them), the outside observation magnification in the video seethrough observation can equate with that in the observation by the naked eye. It is, however, noted that the same effect can also be achieved by setting the angle of image pickup view of the outside image by the image pickup system 10 slightly larger than the angle of display view of the display system 20, cutting off part of the outside image picked up so as to realize 1:1 observation, and displaying the trimmed image on the display element 22 of the display system 20.

Figure 17:
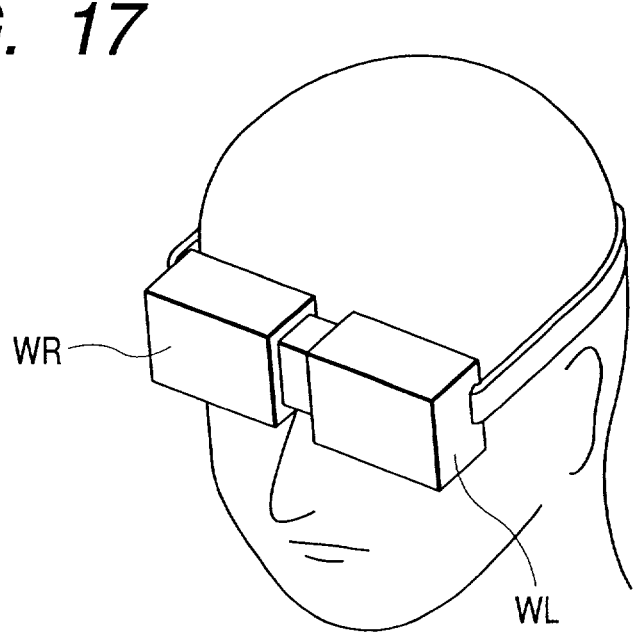
FIG. 17 is an appearance diagram to show the appearance of the image observation system of the present invention.

The image observation system of the present invention is used while the image observation device WL for the left eye of FIG. 16 and the image observation device WR for the right eye in the relation illustrated in FIG. 11 relative to FIG. 16 are mounted on the head as illustrated in FIG. 17.

For the reason illustrated in FIGS. 11 to 15B, this structure prevents the reproduced space from being distorted and permits the observer to succeed in the fusion of the left and right images without stress even in the cases using the zooming function, in the cases wherein the angle of image pickup view is not matched with the angle of display view because of the design factors, manufacturing errors, etc., in the cases wherein the entrance pupil position of the image pickup optical system is not matched with that of the observing eye, and so on.

Further, when each image pickup optical system 11 is comprised of a zooming optical system, the image observation system can present such an effect that the observer can observe the object as if it became closer or it became larger.

For the description below, the explanatory diagrams show only the image observation device WL for the left eye for the sake of simplicity.

Embodiment 6

Figure 18:
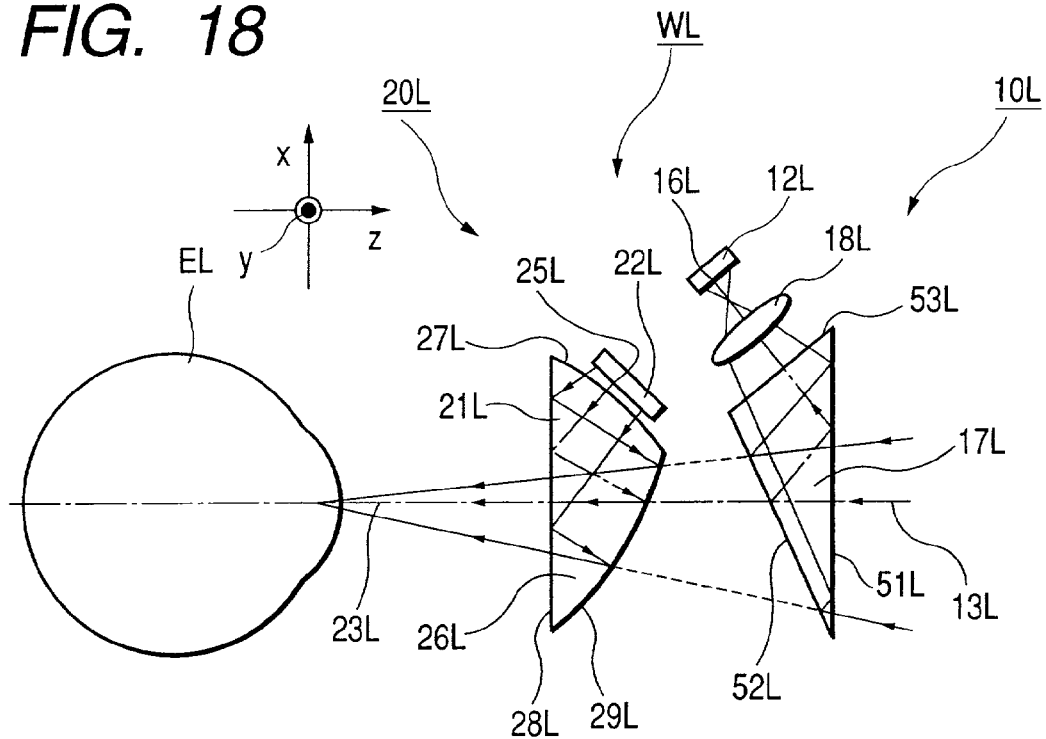
FIG. 18 is a schematic diagram to show the main part of Embodiment 6 of the image observation system of the present invention.

FIG. 18 is a schematic diagram to show the main part of Embodiment 6 of the image observation system according to the present invention.

The display system 20 has the display element 22 such as the LCD, the EL panel, or the like, and a prism body 26. The image pickup system 10 has a prism 17 constructed of planes, the imaging optical system 18 having a positive optical power, and the image pickup device 16 such as the CCD or the like.

In the present embodiment, the display light emerging from the display element 22, which is composed, for example, of the backlight, the polarizer, the transmissive liquid crystal device, etc., is incident to the prism body 26 while being refracted by a surface 27 thereof. The incident light is then incident at angles of incidence over the critical angle to a surface 28 to be reflected totally. The reflected light is then reflected by a mirror surface 29 to be again incident at angles of incidence below the critical angle to the surface 28. The light emerges from the prism body 26 while being refracted by the surface 28. The emergent light is guided to the observing eye E. In order to correct well for the aberration caused by the placement of the surface with the optical power inclined, the prism body 26 is constructed of decentered, rotationally asymmetric surfaces with optical powers differing depending upon azimuthal angles, whereby the display optical system is constructed in compact structure. The position, the focal length, etc. of the prism body 26 are determined so as to form an enlarged virtual image of the display element 22, for example, 2 m ahead of the observing eye E, and the exit pupil thereof is matched with the entrance pupil of the observing eye E.

Here the prism body 26 composes the display optical system 21 and the eye-side optical axis 23 thereof is one defined as a straight line being perpendicular to the plane of the virtual image screen 22' (not illustrated) formed by the display optical system 21 of the display element 22 and passing the center of the exit pupil of the display optical system 21.

On the other hand, the light from the outside is incident to the prism 17 while being refracted by a surface 51 thereof. The incident light is reflected by a mirror surface 52 and the reflected light is incident at angles of incidence over the critical angle to the surface 51 to be reflected totally. The reflected light is then incident at angles of incidence below the critical angle to a surface 53. The light incident to the surface 53 emerges from the prism 17 while being refracted thereby. The emergent light is focused on the image pickup device 12 by the imaging optical system 18. The optical axis 13 of the image pickup system 10 is approximately aligned with the optical axis 23 of the display system 20. The entrance pupil position of the image pickup optical system comprised of the prism body 17 is matched with the entrance pupil position of the observing eye E.

The center of the display element 22 is shifted from the intersection 25 between the display element 22 and the optical axis 23 and the center of the image pickup device 12 from the intersection 16 between the image pickup device 12 and the optical axis 13, each by the amount illustrated in FIG. 11.

The outside image information picked up by the image pickup system 10 is displayed on the display element 22 and is guided to the observing eye E by the display system 20, whereby the observer can observe the outside as if to see it by the naked eye.

For the reason illustrated in FIGS. 11 to 15B, this structure makes the reproduced space free from distortion and permits the observer to effect the fusion of the left and right images successfully without stress even in the cases using the zooming function, in the cases wherein the angle of image pickup view is not matched with the angle of display view because of the design factors, manufacturing errors, etc., in the cases wherein the entrance pupil position of the image pickup optical system is not matched with the entrance pupil position of the observing eye, and so on.

Figure 19:
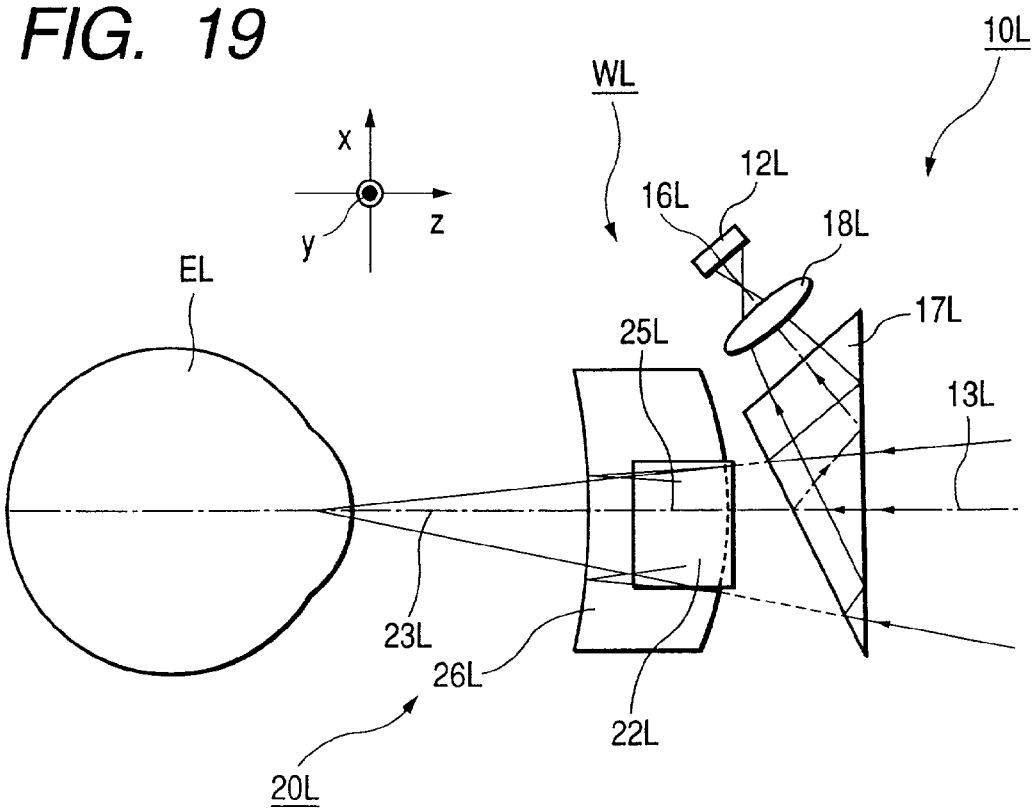
FIG. 19 is an explanatory diagram to show a modification obtained by modifying part of Embodiment 6 of the image observation system of the present invention.

The entire apparatus can be constructed in compact structure by setting the folding (deflecting) direction of the optical axis 23 of the display system 20 to the direction different from that of the image pickup system 10 as illustrated in FIG. 19. In FIG. 19 the display system 20 and the image pickup system 10 have the same functions as in Embodiment 6 illustrated in FIG. 18, and the center of the display element 22 is shifted from the intersection 25 between the display element 22 and the optical axis 23 and the center of the image pickup device 12 from the intersection 16 between the image pickup device 12 and the optical axis 13, each by the amount illustrated in FIG. 11.

Embodiment 7

Figure 20:
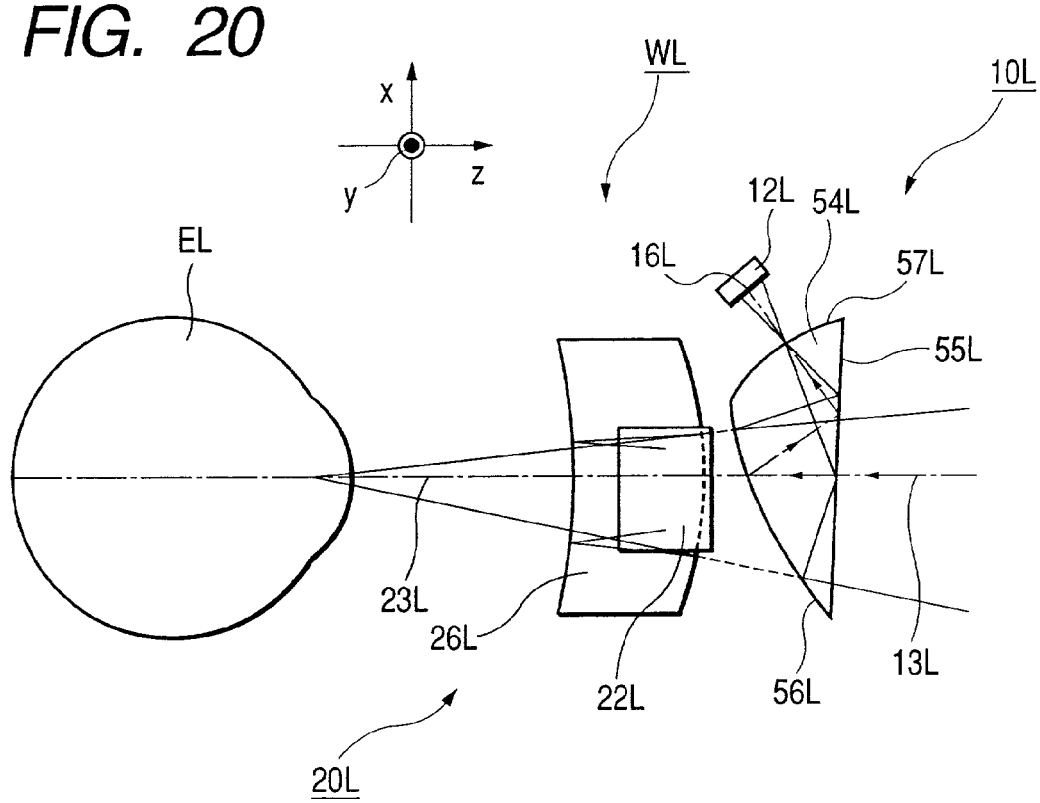
FIG. 20 is a schematic diagram to show the main part of Embodiment 7 of the image observation system of the present invention.

FIG. 20 is a schematic diagram to show the main part of Embodiment 7 of the image observation system according to the present invention. The present embodiment has the same structure as Embodiment 6 illustrated in FIG. 19, except that the form (structure) of the image pickup system 10 is modified.

In FIG. 20 the display system 20 has the same function as in Embodiment 6 illustrated in FIG. 19. The light from the outside is incident to the prism body 54 while being refracted by a surface 55 of the prism body 54. The incident light is then reflected by a mirror surface 56 and is again incident at angles of incidence over the critical angle to the surface 55 to be reflected totally. The reflected light is then incident at angles of incidence below the critical angle to a surface 57 and emerges from the prism body 54 while being refracted thereby. The emergent light is focused on the image pickup device 12.

In order to correct well for the aberration caused by the placement of the surface with the optical power inclined, the prism body 54 is constructed of decentered, rotationally asymmetric surfaces with optical powers differing depending upon azimuthal angles, whereby the image pickup system 10 can be constructed in compact structure.

The center of the image pickup device 12 is shifted from the intersection 16 between the image pickup device 12 and the optical axis 13 by the amount illustrated in FIG. 11.

Embodiment 8

Figure 21:
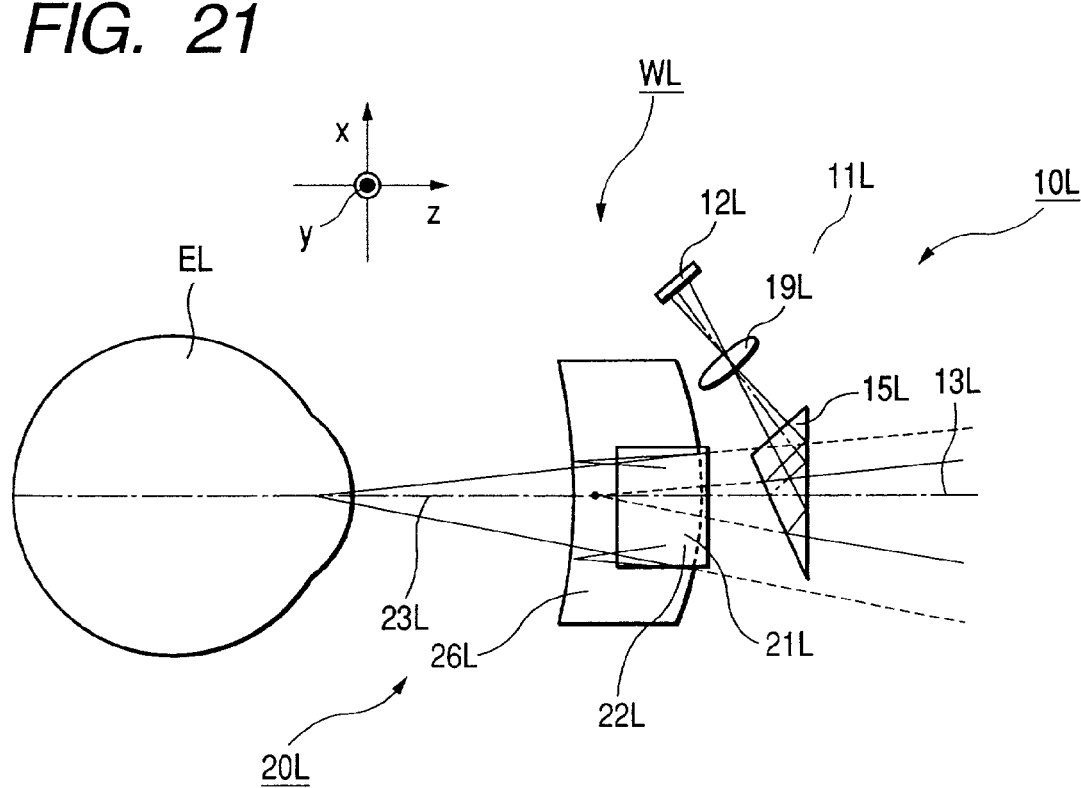
FIG. 21 is a schematic diagram to show the main part of Embodiment 8 of the image observation system of the present invention.

FIG. 21 is a schematic diagram to show the main part of Embodiment 8 of the image observation system according to the present invention. The present embodiment has the same structure as Embodiment 6 illustrated in FIG. 19, except that the form (structure) of the image pickup system 10 is modified.

In the embodiment illustrated in FIG. 21, in contrast to Embodiment 6 illustrated in FIG. 19, the entrance pupil position of the image pickup optical system 11 composed of the prism 15 and the imaging optical system 19 is shifted toward the outside relative to the entrance pupil position of the observing eye E matched with the exit pupil of the display optical system 21 composed of the prism body 26, thereby constructing the apparatus in the compact structure. This structure can prevent the reproduced space from looking small because of the peeping effect. If the shift amount were set too large at this time, the effect on the sense of distance to the object would be enhanced in the space of distance (for example, about 300 mm) close to the observer, and the observer would perceive the object at the position closer than in the observation by the naked eye in certain cases. Therefore, the shift amount is set better in the range of not more than 60 mm. It is desirable that the shift amount be preferably not less than 5 mm and not more than 60 mm. Particularly, when the shift amount is set in the range of not less than 10 mm nor more than 40 mm, the effect on the sense of distance will be rarely perceived.

This structure can also free the reproduced space from distortion and permits the observer to effect the fusion of the left and right images successfully without stress for the reason illustrated in FIGS. 11 to 15B.

Figure 22A:
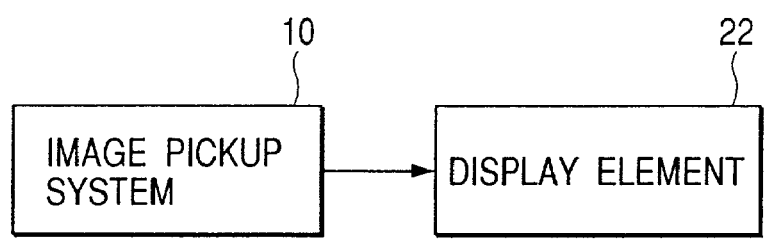
FIG. 22A and FIG. 22B are schematic diagrams to show the main part of the signal processing step in the image observation apparatus of the present invention and the image observation system.
Figure 22B:
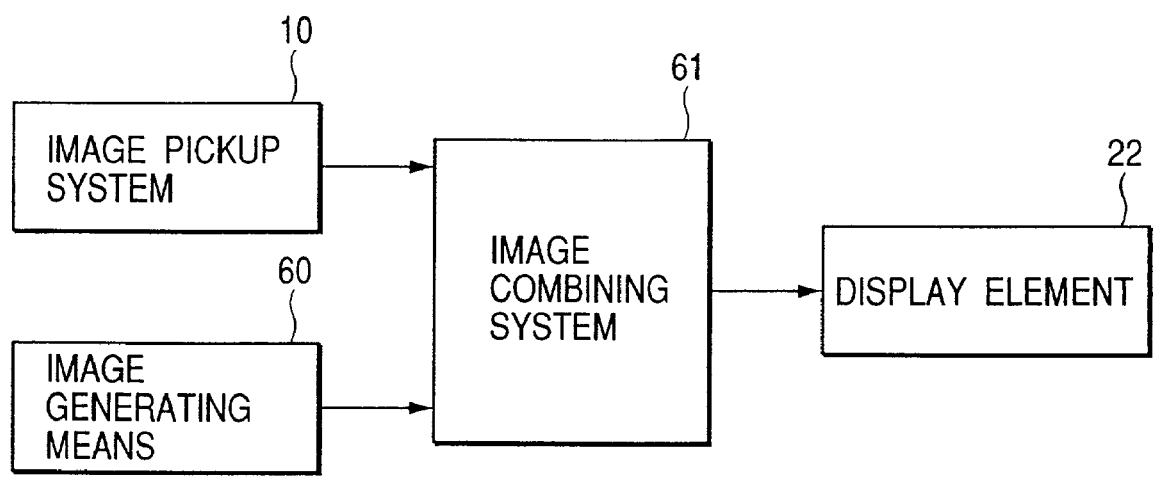
Figure 23:
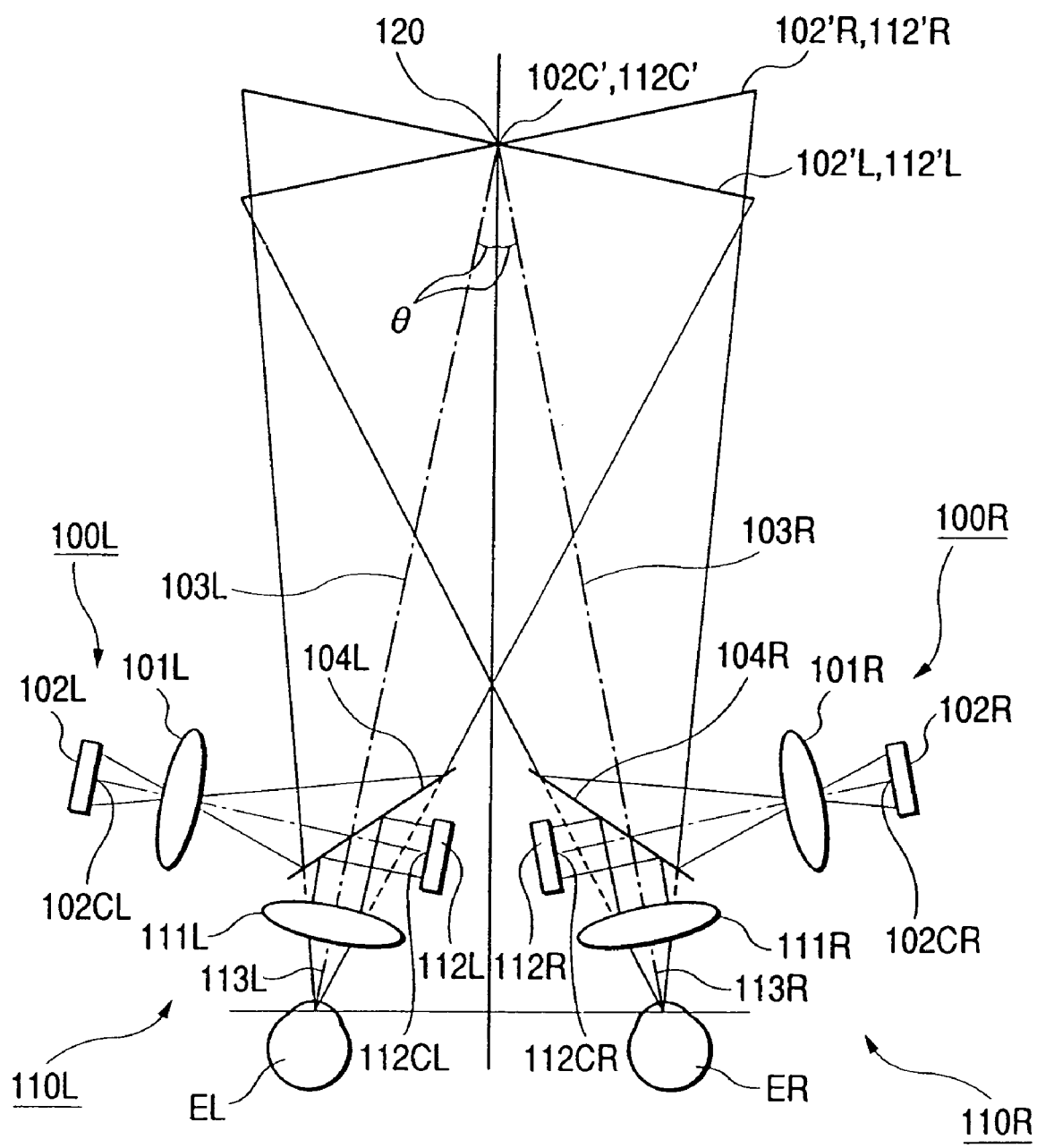
FIG. 23 is a schematic diagram to show the main part of the conventional image observation system.
Figure 24:
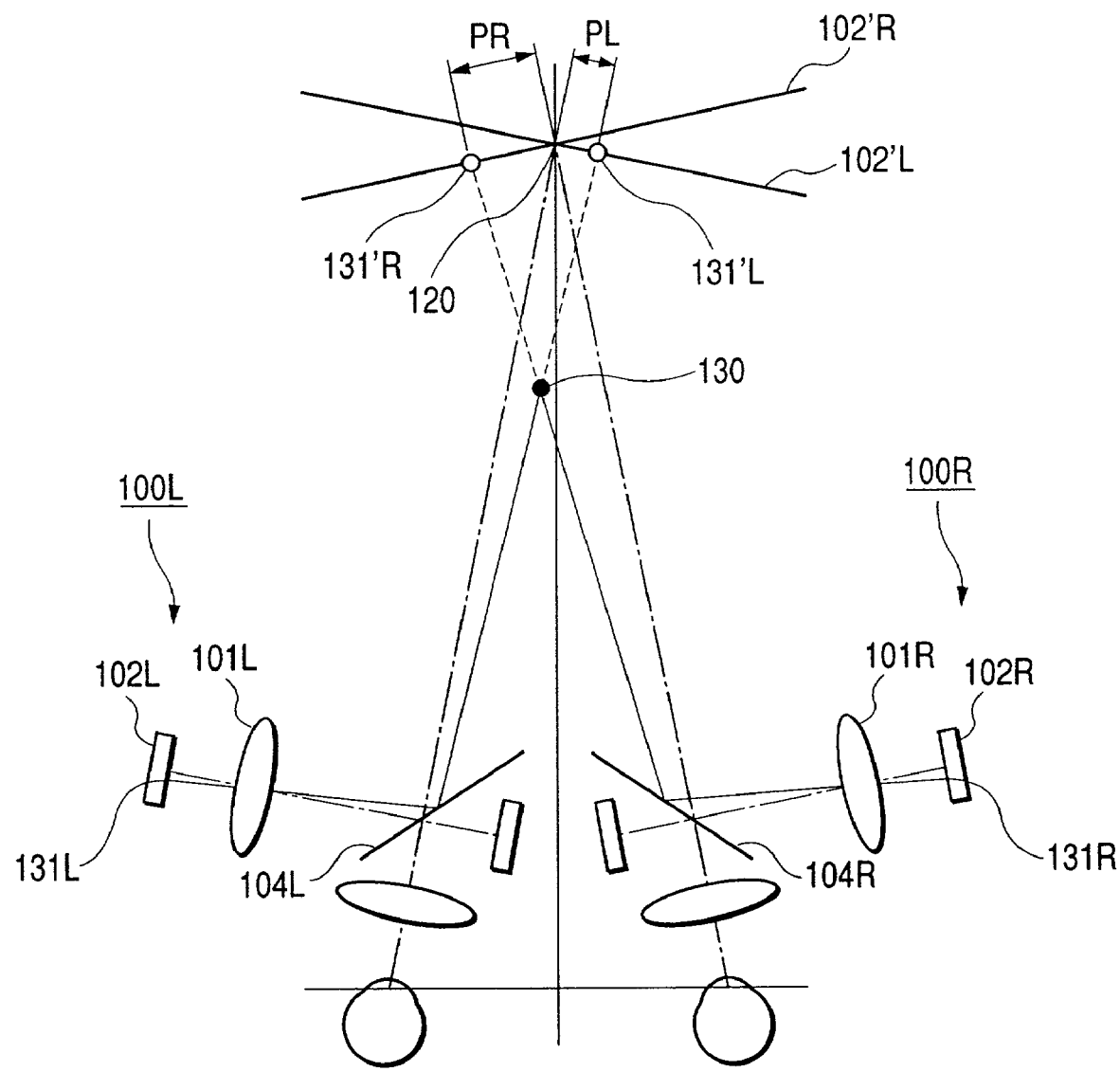
FIG. 24 is a schematic diagram to show the main part of the conventional image observation system.
Figure 25:
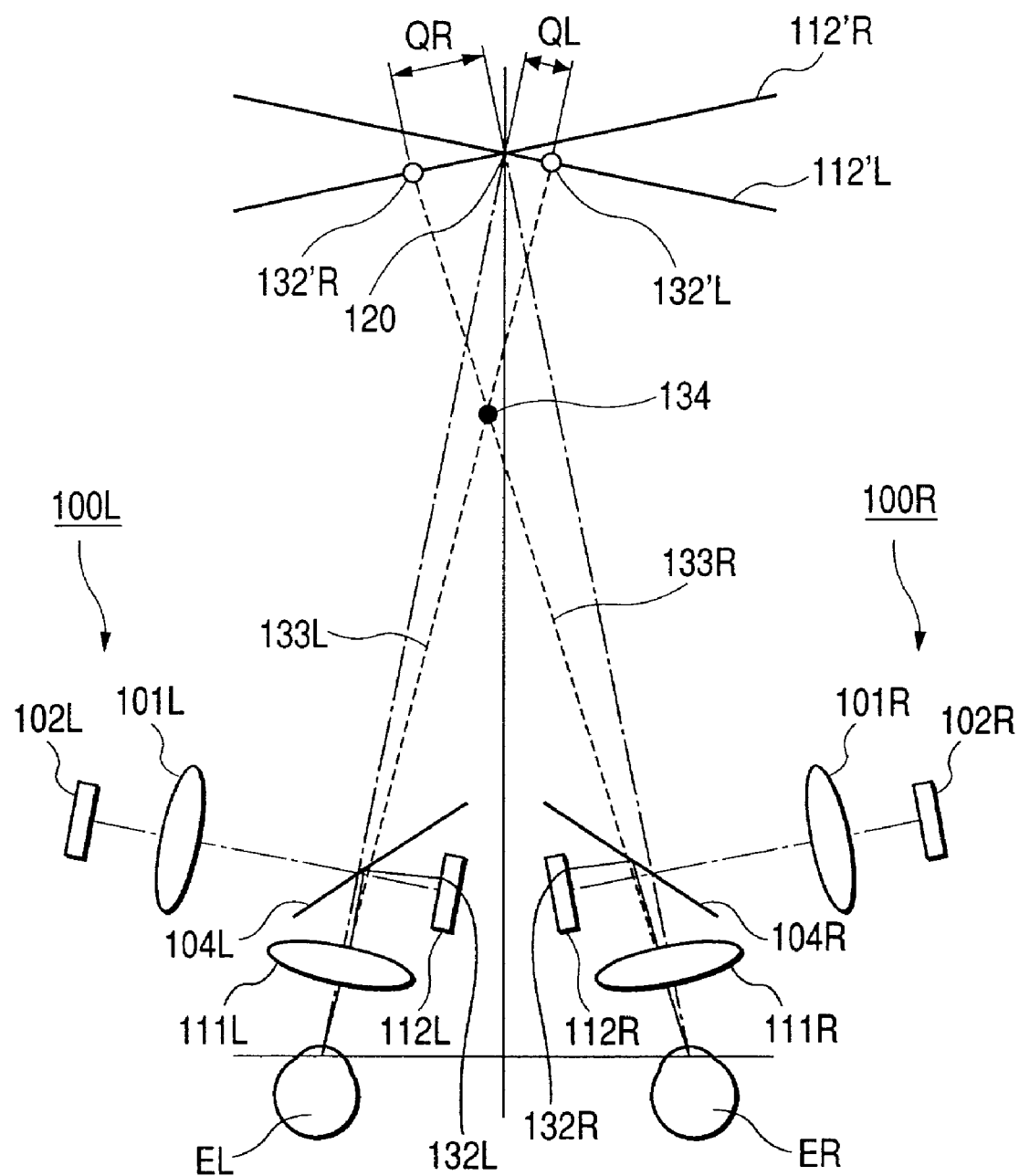
FIG. 25 is a schematic diagram to show the main part of the conventional image observation system.
Figure 26:
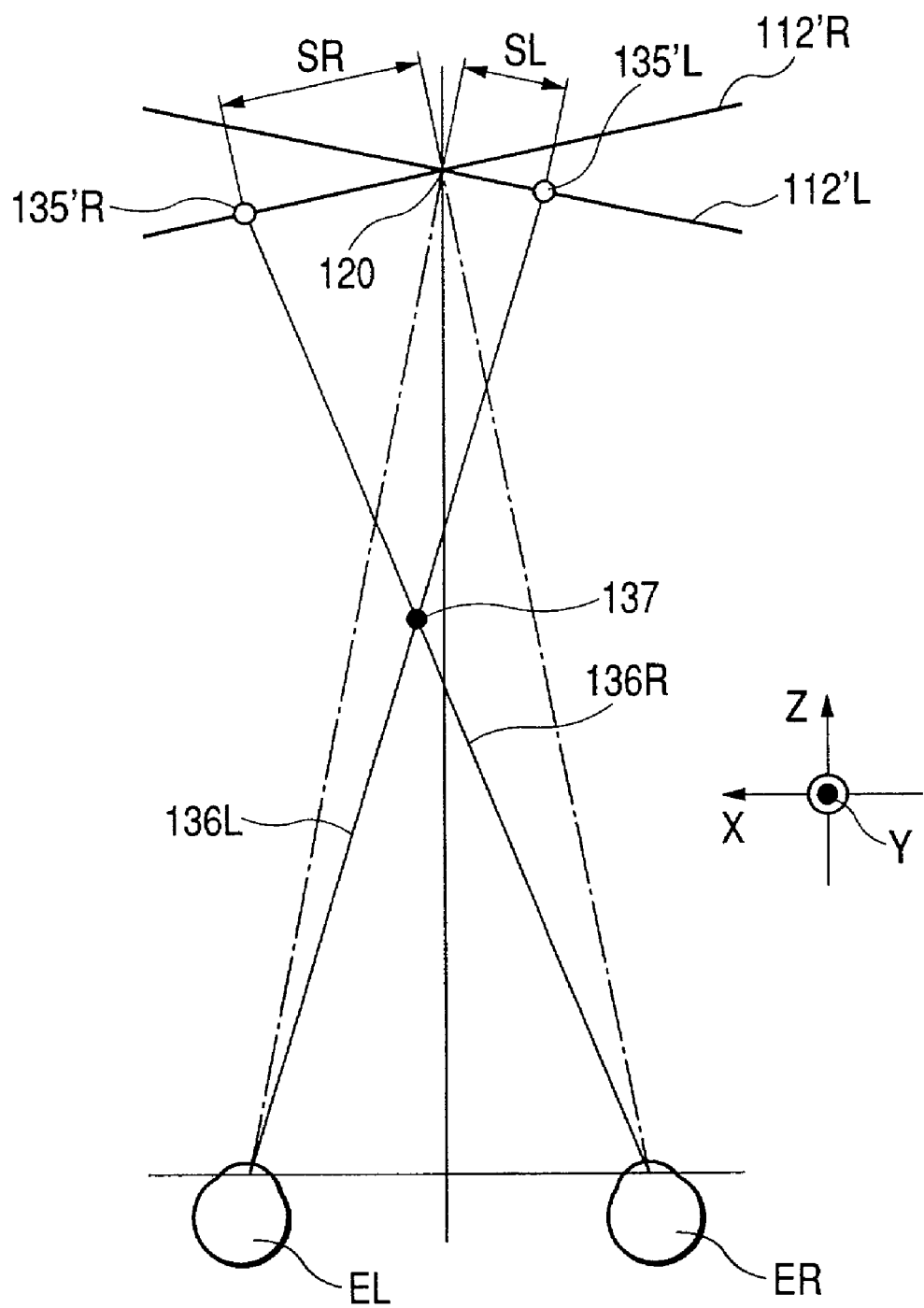
FIG. 26 is a schematic diagram to show the main part of the conventional image observation system.
Figure 27A:
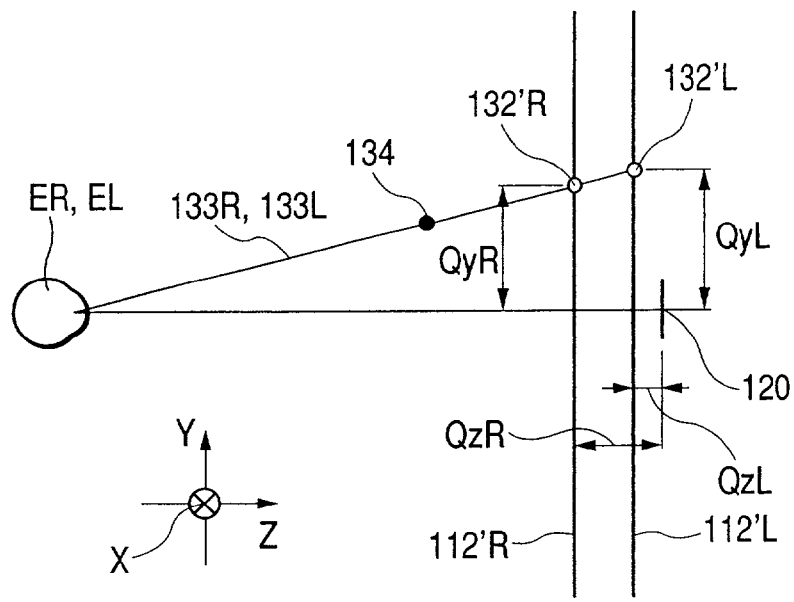
FIG. 27A and FIG. 27B are schematic diagrams to show the main part of the conventional image observation system.
Figure 27B:
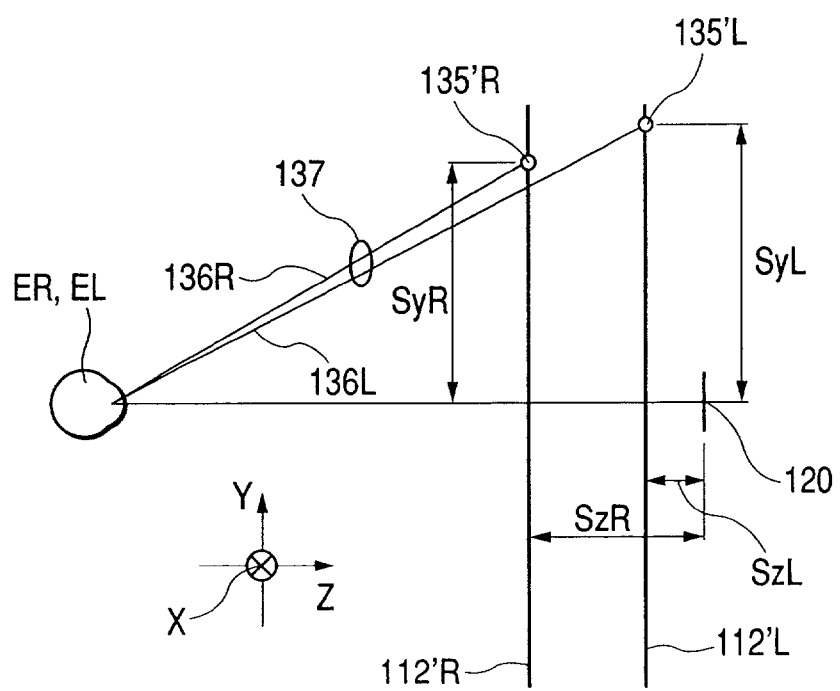
Figure 28:
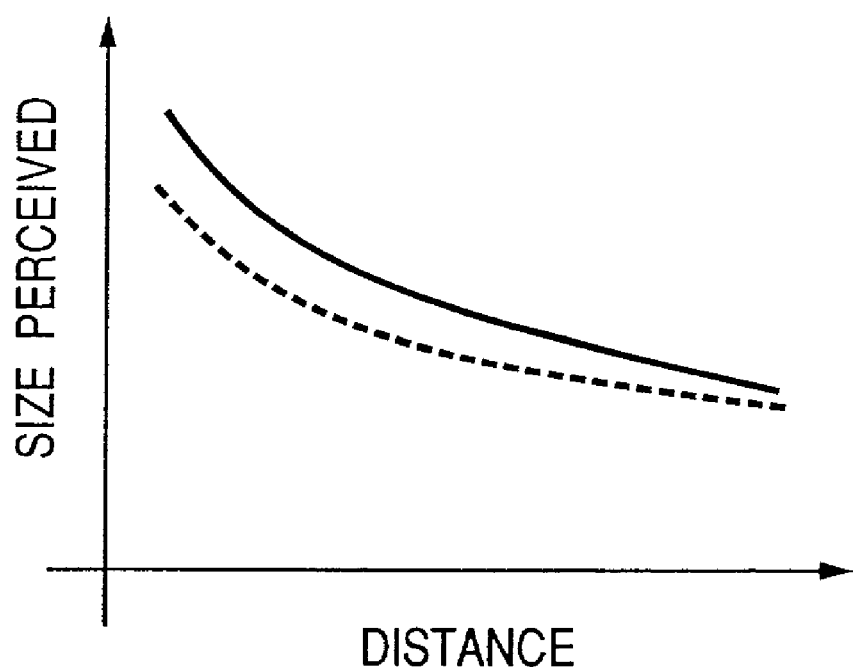
FIG. 28 is an explanatory diagram to illustrate the sizes of the object perceived in the observation by the naked eye and in the video seethrough observation.

In each of the above embodiments, the image displayed on the display element 22 can be the outside image information as it is captured by the image pickup system 10 as illustrated in FIG. 22A, or the image can be a synthetic image displayed on the display element 22 by combining the outside image information captured by the image pickup system 10 with the image information generated by image generating means 60 (which is the image generated by computer graphics or the like, the image recorded by the video system or the like, etc.), in image combining means 61, as illustrated in FIG. 22B.

In each of the above embodiments the display element was the transmissive liquid crystal device, but it may also be a reflective liquid crystal device or a self-emissive device such as the EL device or the like. The image pickup device was the CCD, but it may also be a device such as a CMOS sensor or the like.

According to the present invention, the image observation apparatus permitting the observation of the outside in the same size both in the video seethrough observation and in the observation by the naked eye can be attained by employing either of the above structures.

The present invention also accomplishes the provision of the image observation apparatus that can reduce the load on the observer in the mounted state on the head, while accomplishing the reduction in the size of the entire apparatus.

According to the present invention, the image pickup system is constructed using the prism with one surface having both the transmission action and the total internal reflection action, so as to reduce the size of the entire apparatus and permit the outside light to be guided efficiently to the image pickup device, thereby accomplishing the image observation apparatus capable of readily gaining a bright outside image.

The present invention provides the above structures to accomplish the image observation systems in which the reproduced space is free of distortion and which permits the observer to succeed in the fusion of the images for the left and right eyes without stress even in the cases wherein the zooming function is used in the video seethrough observation, in the cases wherein the angle of image pickup view is not matched with the angle of display view because of the design factors, manufacturing errors, etc., in the cases wherein the entrance pupil position of the image pickup optical system is not matched with the entrance pupil position of the observing eye, and so on.

Since the overlapping range can be set large between the observation fields of the left and right eyes, it can prevent observation from becoming difficult because of the binocular rivalry.

What is claimed is:

1. An image observation apparatus comprising:
 an image pickup system, configured and positioned to acquire an image of an object to be viewed by an eye, denoted as an object image, including:
 an image pickup optical system receiving light from the object; and
 an image pickup device receiving light from said image pickup optical system to acquire an image of the object; and
 a display system, including:
 display means for displaying the object image acquired by said image pickup device; and
 an eyepiece optical system configured and positioned to guide light from said display means to an eye,
 wherein the position of an exit pupil of said eyepiece optical system is approximately matched with the position of an entrance pupil of the eye, so as to permit observation of the image by the eye,
 wherein an optical axis of said image pickup optical system connecting said image pickup optical system with the object is approximately aligned with an extension line of an eye-side optical axis of said eyepiece optical system,
 wherein said image pickup device and said image pickup optical system are positioned closer to said display system than an image pickup device and image pickup optical system positioned to place the entrance pupil of said image pickup optical system at a position optically equivalent to the position of the exit pupil of said eyepiece optical system, thereby shifting the entrance pupil of said image pickup optical system in a direction toward the object from a position optically equivalent to the exit pupil of said eyepiece optical system, and
 wherein the following condition is satisfied:

$$d \leq 60 \text{ (mm)}$$

where d is a shift amount of the entrance pupil of said image pickup optical system relative to the position equivalent to the entrance pupil of the eye.

2. The image observation apparatus according to claim 1, wherein an angle of image pickup view of the outside image acquired by said image pickup system is approximately equated to an angle of display view of display by said display system.

3. The image observation apparatus according to claim 1, which comprises image generating means for generating an image and image combining means for combining images, wherein said image combining means combines the image from the image generating means with the image from said image pickup system to form a synthetic image and displays the synthetic image on said display means.

4. The image observation apparatus according to claim 1, wherein said image pickup system comprises a prism consisting of a plurality of planes, wherein said prism comprises a plane having transmission action and total internal reflection action, and wherein light having passed through the prism is guided to an image pickup device by an optical element having a positive optical power.

5. The image observation apparatus according to claim 1, wherein said image pickup system comprises a decentered, rotationally asymmetric, reflecting surface with optical powers differing depending upon azimuthal angles.

6. The image observation apparatus according to claim 1, wherein said display system comprises a decentered, rotationally asymmetric, reflecting surface with optical powers differing depending upon azimuthal angles.

7. An image observation system wherein a pair of the image observation apparatus in claim 1 are provided for the left and right eyes of an observer.

8. An image observation apparatus comprising:
 an image pickup system, including an image pickup optical system, configured and positioned to acquire an image of an object to be viewed by an eye, denoted as an object image, via said image pickup optical system; and a display system, including:

display means for displaying the object image acquired by said image pickup system; and an eyepiece optical system configured and positioned to guide light from said display means to an eye, wherein the position of an exit pupil of said eyepiece optical system is approximately matched with the position of an entrance pupil of the eye, so as to permit observation of the image by the eye; and a prism body having a decentered, rotationally asymmetric, reflecting surface with optical powers differing depending upon azimuthal angles, wherein an optical axis of said image pickup optical system connecting said image pickup optical system with the object is approximately aligned with an extension line of an eye-side optical axis of said eyepiece optical system, wherein an entrance pupil of said image pickup optical system is shifted in a direction toward the object from a position optically equivalent to the exit pupil of said eyepiece optical system compared to the position of an entrance pupil of an image pickup optical system that is optically equivalent to the exit pupil of said eyepiece optical system, and wherein, where the amount of the shift is d, the shift amount d satisfies the following condition:

$d \leq 60$ (mm).

9. The image observation apparatus according to claim 8, wherein said image pickup system comprises a reflecting surface and wherein a direction of deflection of the optical axis by the reflecting surface is a direction different from a direction of deflection of the optical axis by the reflecting surface of said display system.

10. The image observation apparatus according to claim 8, wherein an angle of image pickup view of the object image acquired by said image pickup system is approximately equated to an angle of display view of display by said display system.

11. The image observation apparatus according to claim 8, which comprises image generating means for generating an image and image combining means for combining images, wherein said image combining means combines the image from the image generating means with the image from said image pickup system to form a synthetic image and displays the synthetic image on said display means.

12. The image observation apparatus according to claim 8, wherein said image pickup system comprises a prism consisting of a plurality of planes, wherein said prism comprises a plane having transmission action and total internal reflection action, and wherein light having passed through the prism is guided to an image pickup device by an optical element having a positive optical power.

13. The image observation apparatus according to claim 8, wherein said image pickup system comprises a decentered, rotationally asymmetric, reflecting surface with optical powers differing depending upon azimuthal angles.

14. An image observation system wherein a pair of the image observation apparatus in claim 8 are provided for the left and right eyes of an observer.

15. The image observation system according to claim 14, wherein the image pickup device of the image pickup system of each image observation apparatus is shifted horizontally by a predetermined distance relative to the optical axis of the image pickup optical system, wherein the display means of each image observation apparatus is shifted horizontally by a predetermined distance relative to the optical axis of the eyepiece optical system, and wherein the optical axes of the image pickup optical systems and the optical axes of the eyepiece optical systems in the pair of image observation apparatuses for the left and right eyes are parallel to each other.

16. The image observation system according to claim 15, wherein focus positions of said image pickup optical systems for the left and right eyes are matched with each other, shift amounts of said image pickup devices are set so as to match positions conjugate with centers of the respective image pickup devices by the image pickup optical systems for the left and right eyes with each other, positions of virtual images of said display elements by the display optical systems for the left and right eyes are matched with each other, and shift amounts of the display elements are set so as to match positions conjugate with centers of the respective display elements by the display optical systems for the left and right eyes with each other.

17. The image observation system according to claim 16, wherein said focus positions are matched with said positions of the virtual images.

18. The image observation system according to claim 15, wherein said display optical system of each image observation device comprises a decentered, rotationally asymmetric, reflecting surface with optical powers differing depending upon azimuthal angles.

19. The image observation system according to claim 15, wherein said image pickup optical systems are zooming optical systems.

20. The image observation system according to claim 15, which comprises image processing means for changing a display magnification when the object images acquired by said image pickup systems are displayed on said display elements.

21. The image observation system according to claim 7, wherein the image pickup device of the image pickup system of each image observation apparatus is arranged so that a center thereof is shifted by a predetermined distance in a direction perpendicular to the optical axis of the image pickup optical system and wherein the display means of each image observation apparatus is arranged so that a center thereof is shifted by a predetermined distance in a direction perpendicular to the optical axis of the display optical system.

22. The image observation system according to claim 21, wherein the system-object optical axes of said pair of image pickup optical systems for the left and right eyes are parallel to each other.

23. The image observation system according to claim 22, wherein positions of an object formed on said image pickup devices by said image pickup systems are matched with positions where virtual images of said display elements are formed by said display systems.

24. The image observation system according to claim 23, wherein object-side positions of centers of said image pickup devices by said image pickup systems are matched with positions where virtual images of centers of said display elements are formed by said display systems.

* * * * *

UNITED STATES PATENT AND TRADEMARK OFFICE
CERTIFICATE OF CORRECTION

PATENT NO.        : 6,980,363 B1
APPLICATION NO. : 09/653278
DATED              : December 27, 2005
INVENTOR(S)       : Akinari Takagi et al.

It is certified that error appears in the above-identified patent and that said Letters Patent is hereby corrected as shown below:

COLUMN 1
Line 47, "expeimentally" should read --experimentally--.

COLUMN 22
Line 62, "apparatus" should read --apparatuses--.

COLUMN 23
Line 61, "apparatus" should read -- apparatuses--.
Line 63, "claim 14," should read --claim 7,--.

Signed and Sealed this

Twenty-fifth Day of July, 2006

JON W. DUDAS
*Director of the United States Patent and Trademark Office*